United States Patent [19]

Watanabe et al.

[11] Patent Number: 5,309,760
[45] Date of Patent: May 10, 1994

[54] METHOD AND APPARATUS FOR MEASURING THE CONTENT OF A STORAGE VESSEL

[75] Inventors: Kajiro Watanabe, Tokyo; Katushi Ohneda, Saitama, both of Japan

[73] Assignee: Kanto Seiki Co., Ltd., Omiya, Japan

[21] Appl. No.: 743,515

[22] Filed: Aug. 12, 1991

Related U.S. Application Data

[63] Continuation-in-part of Ser. No. 376,665, Jul. 7, 1989, abandoned.

[30] Foreign Application Priority Data

| Jul. 7, 1988 | [JP] | Japan | 63-169633 |
| Jul. 7, 1988 | [JP] | Japan | 63-169634 |
| Jul. 7, 1988 | [JP] | Japan | 63-169635 |
| Feb. 7, 1989 | [JP] | Japan | 1-27808 |
| Feb. 7, 1989 | [JP] | Japan | 1-27809 |
| Mar. 14, 1989 | [JP] | Japan | 1-28948[U] |

[51] Int. Cl.⁵ .................................. G01F 17/00
[52] U.S. Cl. ................................................ 73/149
[58] Field of Search .......................... 73/149; 364/564

[56] References Cited

U.S. PATENT DOCUMENTS

4,599,892 7/1986 Doshi .................................. 73/49.2

FOREIGN PATENT DOCUMENTS

2144550 6/1985 United Kingdom .

OTHER PUBLICATIONS

K. Watanabe, et al., *ISA Transactions*, "Volume Measurement of Deformed Materials in Tanks", vol. 27, No. 4, 1988, pp. 9–19.

*Primary Examiner*—Robert Raevis
*Attorney, Agent, or Firm*—Foley & Lardner

[57] ABSTRACT

The peak amplitude values of two different frequency pressure changes produced by the displacement device of a volume sensing arrangement, are obtained and one divided by the other to produce a value indicative of the volume of the unfilled portion of a storage vessel. The contents of the vessel are derived by subtracting the unfilled volume from the vessel capacity. In the embodiments wherein a single pressure sensor is used, the signal is simultaneously filtered with a low pass filter and a band pass filter in order to obtain static and dynamic pressure data. In some embodiments the single sensor is disposed in a chamber in which the displacement means produces two different frequency pressure variations. The chamber is communicated with the storage vessel by a pipe the length and diameter of which are selected to prevent the pressure variations produced by one of the frequencies from being transmitted therethrough. In other embodiments two pressure sensors are used and the special pipe dispensed with and the outputs of the two sensors fed individually to band pass filters.

5 Claims, 32 Drawing Sheets

METHOD AND APPARATUS FOR MEASURING THE CONTENT OF A STORAGE VESSEL

This application is a continuation-in-part of application Ser. No. 07/376,665, filed Jul. 7, 1989, now abandoned.

BACKGROUND OF THE INVENTION

1. Field of the Invention

The present invention relates generally to measuring the contents of a vessel and more specifically to such a technique and an apparatus which enables the content of a vessel to be determined without the need for immersing probes and the like into the fluid or material which is stored in the vessel.

2. Description of the Prior Art

FIGS. 1 to 5 show a prior art vessel content measuring apparatus disclosed in JP-A-63-108231 which was provisionally published on May 13, 1985.

As shown schematically in FIG. 1 the vessel or tank 1 which in this instance is an automotive fuel tank (merely by way of example) is partially filled with a liquid fuel in a manner to define an air space therein. A fuel line 1a leads from the bottom of the tank and leads to an engine not shown. The upper portion of the fuel tank is formed with a filler neck 1b which is sealingly closed by a cap 1c. A conduit 2 leads from the neck to a fuel volume sensing arrangement generally denoted by the numeral 3.

This arrangement comprises a first chamber 4 which will be referred to as a compensation chamber which communicates with the conduit 2 via an ON/OFF type valve 6. A sub-chamber 8 is fluidly communicated with the conduit 2 at a location between the fuel tank 1 and the valve 6.

A pressure sensor arrangement 10 of the nature shown in FIG. 2 is disposed in the compensation tank 4. This sensor 10 includes a diaphragm 10a which divides the sensor housing into a first chamber pressure sensing chamber 10b which is in fluid communication with the compensation chamber 4 and a second standard or reference pressure chamber 10c which is in fluid communication with the sub-chamber 8. A strain gauge type pressure sensing element 10e is mounted on the diaphragm 10a and arranged to output a signal indicative of the amount flexure the diaphragm undergoes. This signal is supplied to a circuit arrangement the nature of which will be disclosed in detail later.

A cylinder 12 in which a reciprocal piston 12a is disposed is fluidly communicated with the compensation chamber. The piston 12a is provided with a special seal 12b arrangement which ensures a hermetic seal is formed between the outer periphery of the piston 12a and the bore of the cylinder 12.

The piston 12a is connected by way of connecting rod 13 with a crank 14. The crank 14 is in drive connection with an electric motor 16 by way of a reduction gear 17 and further provided with a suitable marker 14a which cooperates with a light sensor 18 which is located immediately adjacent the periphery of the crank 14.

The light sensor 18 is arranged to detect the passing of the marker 14a and output a signal to a motor control circuit 20. This circuit 20 is arranged to energize the motor 16 in a manner which maintains the angular rotational speed of the crank 14 constant at a predetermined level.

The pressure signal generated by the pressure sensor 10 is supplied firstly to a band pass filter 22 which is set in accordance with the predetermined angular rotational speed of the crank in order to screen out noise and the effects of temperature related drift. The output of the band pass filter 22 is next supplied to an amplitude detection circuit 23 wherein the peak amplitude value is detected. An APU circuit 24 which includes in this instance a microprocessor (CPU, ROM etc) is arranged to receive the output from the amplitude detection circuit 23 and to derive the volume of the liquid which is contained in the fuel tank 1, issue a suitable signal to a display unit 25 which indicates the volume; and output control signals to the valve 6 and the motor control circuit 20.

Before proceeding with an explanation of the operation of the above arrangement, it is deemed appropriate to turn to FIGS. 3 and 4 and to consider the concept on which the above measuring system is based.

Under the conditions shown in shown in FIG. 3 wherein the piston 12a is at BDC and the valve 6 is open, and further given that:

VT denotes the total volume of the vessel 1;
V1 denotes the volume of the correction chamber 4;
vo denotes the maximum volume change which can occur in said cylinder 12 ($<<$V1,V2);
V2 denotes the volume of the vessel 1 not occupied by the liquid medium;
VL denotes the volume of the liquid (solid or powder etc.) contained in the vessel 1 (main tank) and
Po denotes the pressure within the vessel 1:
   then, according to Poisson's Law it can be shown that:

$$Po(V2+vo+V1)^\gamma = nRTo \qquad (1)$$

wherein:

n denotes the number of mols contained in the cylinder 12, compensation chamber 4 and the portion of the vessel or tank 1 which is not filled with liquid;
R is a gas constant;
To is the absolute temperature and $\gamma$ is the ratio of isopiestic specific heat and isovolumic specific heat.

In this situation, if the piston 12a is stroked adiabatically, as shown in FIG. 3, vo=0 and at the same time the pressure in the tank is increased by $\Delta$Po. Therefore:

$$(Po+\Delta Po)(V2+v1)^\gamma = nRTo \qquad (2)$$

Accordingly, from equations (1) and (2) it can be shown that:

$$Po(V2+vo+V1)^\gamma = (Po+\Delta Po)(V2+V1)^\gamma \qquad (3)$$

Via approximation it is possible to express the above as:

$$\frac{\gamma Po vo}{V1 + V2} = \Delta Po \qquad (4)$$

By rearrangement, the unfilled volume V2 of the tank can be shown to be:

$$V2 = \frac{\gamma Po vo}{\Delta Po} - V1 \qquad (5)$$

In the case the valve 6 is closed and the communication between the compensation chamber 4 and the interior of the tank 1 is cut-off and the situation shown in FIG. 3 becomes such that:

$$Po\,(vo+V1)\gamma = nRTo \qquad (6)$$

while in the case of the situation shown in FIG. 4 (Viz., under the conditions wherein valve 6 is open)

$$(Po+\Delta Po')\,V1\gamma = nRTo \qquad (7)$$

Thus, similar to the above equations 6 and 7 can be equated to give:

$$Po\,(vo+V1)\gamma = (Po+\Delta Po')\,V1\gamma \qquad (8)$$

and via approximation $$\frac{\gamma Povo}{V1} = \Delta Po' \qquad (9)$$

By rearrangement $$V1 = \frac{\gamma Povo}{\Delta Po'} \qquad (10)$$

Given that vo and V1 are known, $\Delta Po$ and $\gamma Po$ can be readily derived.

Therefore using equation 5 it is possible to monitor the output of the pressure sensor 10 and derive V2. VL (the volume of liquid in the tank) can then be determined by subtracting V2 from the total tank volume VT (viz., Vt −V2)

The operation of the arrangement shown in FIG. 1 will now be discussed with reference to the flow chart shown in FIG. 5.

The first step 1001 of the routine depicted in this flow chart is such as initialize the system. A predetermined period after the initialization, a command which opens the valve 6 is issued in step 1002. This command induces the issuance of a signal which is supplied to the valve 6 and which induces the same to open. Following the opening of the valve 6, piston 12a is permitted to reciprocate a plurality of times during which a plurality $\Delta Po'$ readings are taken and averaged. Using this data and equation 10, the value of $\gamma Po$ is derived. That is to say, the ROM of the microprocessor contains pre-recorded data pertaining to the volume V1 of the compensation chamber and the maximum volume change vo of the cylinder, whereby, when in possession of the average $\Delta Po'$ data, it is possible to calculate $\gamma Po$ using the equation:

$$\gamma Po = \Delta Po' \frac{V1}{vo} \qquad (11)$$

Following this, a command is issued to close the valve 6 (step 1004) and in step 1005 the volume V2 of the tank which is filled with gas (air), is calculated. Following this, at step 1006 the value VT which was read of ROM along with a number of other prerecorded data for the purposes of the V2 calculation, is used in step in order to determine the amount of liquid in the tank (i.e. VT−V2=VL). At step 1007 signals which induce the display of the "level" of the fuel in the tank 1 are issued to the display and the program recycles to step 1002.

It should be noted that this routine includes a non-illustrated cancellation step which is arranged between steps 1005 and 1006 which is responsive to abnormally large changes in the gaseous volume V2.

More specifically, when the power is supplied to the circuit arrangement, the output of the light sensor 18 is supplied to the motor control circuit 20 and the crank 16 is rotated until it is aligned with the marker 14a. Following this, a signal is issued to the valve 6 which induces the same to assume a closed condition. At the same time a signal is supplied to the motor control circuit 20 which induces a predetermined number of motor rotations at a predetermined rotational speed. This induces the crank 14 to be rotated and the piston 12a to be reciprocated in the cylinder 12 in a manner wherein the volume of air V1 the cylinder is totally displaced into the compensation chamber 4 and then re-induced.

This causes the pressure prevailing in the compensation tank 4 to rise and fall. In response to this the pressure prevailing in the pressure sensing chamber 10b of the pressure sensor 10 is compared with that prevailing in the reference chamber 8 and the resulting flexure of the diaphragm 10a is translated into an electrical signal by the strain gauge 10e. This signal is supplied by way of the band pass filter 22 to the amplitude detection circuit 23 wherein in the peak value of the signal is determined. The value of $\gamma Po$ is the derived by the APU 24 and recorded in a register of the CPU included therein.

Following this, the APU 24 issues a signal which cancels the valve closure and permits the same to open. The motor 16 is then induced to rotate for a second predetermined number of revolutions which is greater than the predetermined number of rotations induced during the operation wherein the data for the derivation of $\Delta Po$ was collected. During this second set of rotations the data required for the solving of equation 5 is collected, the requisite data read of ROM, and the volume V2 of the unfilled portion V2 of the tank 1 is derived using the coefficient $\Delta Po$.

The amount of liquid VL in the tank is derived by subtraction as indicated above.

However, this arrangement has suffered from the drawbacks that in order to derive the coefficient $\Delta Po$, it is necessary to provide the compensation tank 4 and and valve 10 and as such it is not possible to render the arrangement sufficiently compact as to enable the ready deployment in vehicles and the like, wherein space is at a premium.

Further, as the valve 6 defines a passage structure which has a limited cross sectional area (when open), a flow resistance tends to be produced which interferes with the transmission of pressure between the tank 1 and the compensation chamber 4 and thus introduces an error into the measurement. To solve this problem it has been considered to increase the size of the valve 6. However, this increases the bulk and cost of the arrangement.

SUMMARY OF THE INVENTION

It is an object of the present invention to provide a measuring arrangement of the nature disclosed above but which is highly compact and can do away with the need to provide bulky auxiliary chambers, valve and the like.

In brief, the above object is achieved an arrangement wherein the peak amplitude values of two different frequency pressure changes produced a the displacement device of the volume sensing arrangement, are obtained and one divided by the other to produce a value indicative of the volume of the unfilled portion of a storage vessel. The contents of the vessel are derived by subtracting the unfilled volume from the vessel capacity.

In the embodiments wherein a single pressure sensor is used, the signal is simultaneously filtered with a low pass filter and a band pass filter in order to obtain static and dynamic pressure data. In some embodiments the single sensor is disposed in a chamber in which the displacement means produces two different frequency pressure variations. The chamber is communicated with the storage vessel by a pipe the length and diameter of which are selected to prevent the pressure variations produced by one of the frequencies from being transmitted therethrough.

In other embodiments wherein two pressure sensors are used and the special pipe dispensed with and the outputs of the two sensors fed to band pass filters.

More specifically, a first aspect of the present invention comes in a device for measuring the contents of a vessel of known capacity, which features: an air bleed, the air bleed providing a limited fluid communication between the interior of the vessel and the atmosphere; means for causing the pressure in the vessel to vary; pressure sensor means for detecting the pressure changes which occur in the vessel; circuit means for receiving the output of the pressure sensor means and filtering out first and second pieces of data therefrom, the circuit means modifying the first and second pieces of data in a manner which produces a signal indicative of the contents of the vessel.

A second aspect of the present invention comes in a device for measuring the contents of a vessel which exhibits a predetermined amount of flexibility, comprising: an air bleed, the air bleed fluidly communicating the interior of the vessel with the atmosphere; means for causing the pressure in the vessel to vary at a predetermined frequency; pressure sensor means for detecting pressure changes associated with the pressure change which is caused to occur in the vessel; and circuit means for receiving an output of the pressure sensor means and for filtering static pressure amplitude data and dynamic pressure amplitude data therefrom, the circuit means further including computation means for modifying the static pressure amplitude data with the dynamic pressure amplitude data to obtain a volume which can be subtracted from the total volume of the vessel plus a predetermined correction factor which compensates for the flexibility of the vessel in a manner which indicates the contents of the vessel.

A third aspect of the present invention comes in a device for measuring the contents of a vessel which exhibits a predetermined amount of flexibility, the device featuring: an air bleed, the air bleed fluidly communicating the interior of the vessel with the atmosphere; means for causing the pressure in the vessel to vary at a predetermined frequency; pressure sensor means for detecting pressure changes which occur as a direct result of the change in pressure which is caused to occur in the vessel, and for producing outputs indicative thereof; circuit means for: receiving outputs of the pressure sensor means and filtering out first and second amplitude data therefrom, and processing the first and second amplitude data in a manner which which corrects for the flexibility of the vessel and produces a signal indicative of the contents of the vessel.

A fourth aspect of the present invention comes in a measuring arrangement comprising: a vessel of known volume; an air bleed, the air bleed providing restricted fluid communicating between the interior of the vessel and the atmosphere; means defining a chamber; a displacement device disposed in the chamber, the displacement device being arranged to vary the pressure in the chamber, the displacement device dividing the chamber into first and second portions, the first portion being enclosed within the chamber and the second portion being fluidly communicated with the interior of the vessel; means providing a limited amount of fluid communication between the first portion of the chamber and the interior of the vessel; a first pressure sensor, the pressure sensor being responsive to the pressure in the first portion of the chamber and arranged to produce a first output indicative thereof; a second pressure sensor, the second pressure sensor being responsive to the pressure in the vessel and arranged to produce a second output indicative thereof; circuit means for receiving the outputs of the first and second pressure sensors and for filtering out first and second data, respectively, the circuit means including means for processing the first and second data in a manner which produces a signal indicative of the contents of the vessel.

A fifth aspect of the present invention comes in a method of measuring the contents of a vessel of known capacity, comprising the steps of: selectively inducing the pressure in the vessel to vary; sensing pressure changes which occur in response to the pressure in the vessel being induced to vary and producing first and second signals indicative thereof; filtering out first and second pieces of data from the first and second signals; and modifying the first and second pieces of data in a manner which produces a signal indicative of the contents of the vessel.

A sixth aspect of the present invention comes in a method of measuring the contents of a vessel which exhibits a predetermined amount of flexibility, comprising the steps of: inducing the pressure in the vessel to vary at a predetermined frequency; sensing changes in pressure which are associated with the change of pressure in the vessel using pressure sensor means and producing first and second signals indicative thereof; filtering static pressure amplitude data and dynamic pressure amplitude data from the first and second signals; and modifying the static pressure amplitude data with the dynamic pressure amplitude data and a correction factor which compensates for the flexibility of the vessel to obtain a volume which can be subtracted from the total volume of the vessel in a manner to indicate the contents of the vessel.

A seventh aspect of the present invention comes in a method of measuring the contents of a vessel which exhibits a predetermined amount flexibility, comprising the steps of: inducing the pressure in the vessel to vary at a predetermined frequency; detecting the pressure changes which occur in the vessel and producing first and second outputs indicative thereof using pressure sensor means; filtering the first and second outputs, the filtering comprising the use of circuit means which receives the first and second outputs of the pressure sensor means and filters out first and second discrete amplitude data therefrom; and processing the first and second discrete amplitude data in a manner which compensates for the flexibility of the vessel and produces a signal indicative of the contents of the vessel.

An eighth aspect of the present invention comes in a method of measuring the contents of a vessel, comprising the steps of: permitting restricted fluid communication between the interior of the vessel and the ambient atmosphere by way of an air bleed; energizing a displacement device which is disposed in a chamber fluidly communicated with the vessel, in a manner which varies the pressure in the chamber and in the vessel; sensing the pressure in the chamber using a first pressure sensor and producing a first output indicative thereof; sensing the pressure in the vessel using a second pressure sensor and producing a second output indicative thereof; filtering the first and second outputs to obtain first and second pieces of information; and processing the first and second pieces of information in a manner which produces signal indicative of the contents of the vessel.

BRIEF DESCRIPTION OF THE DRAWINGS

FIG. 14 is a graph which is similar to that shown in FIG. 13 but which additionally shows the noise caused by the heat of fuel being returned to the fuel tank from a fuel injection system or the like;

DETAILED DESCRIPTION OF THE PREFERRED EMBODIMENTS

Figure 1:
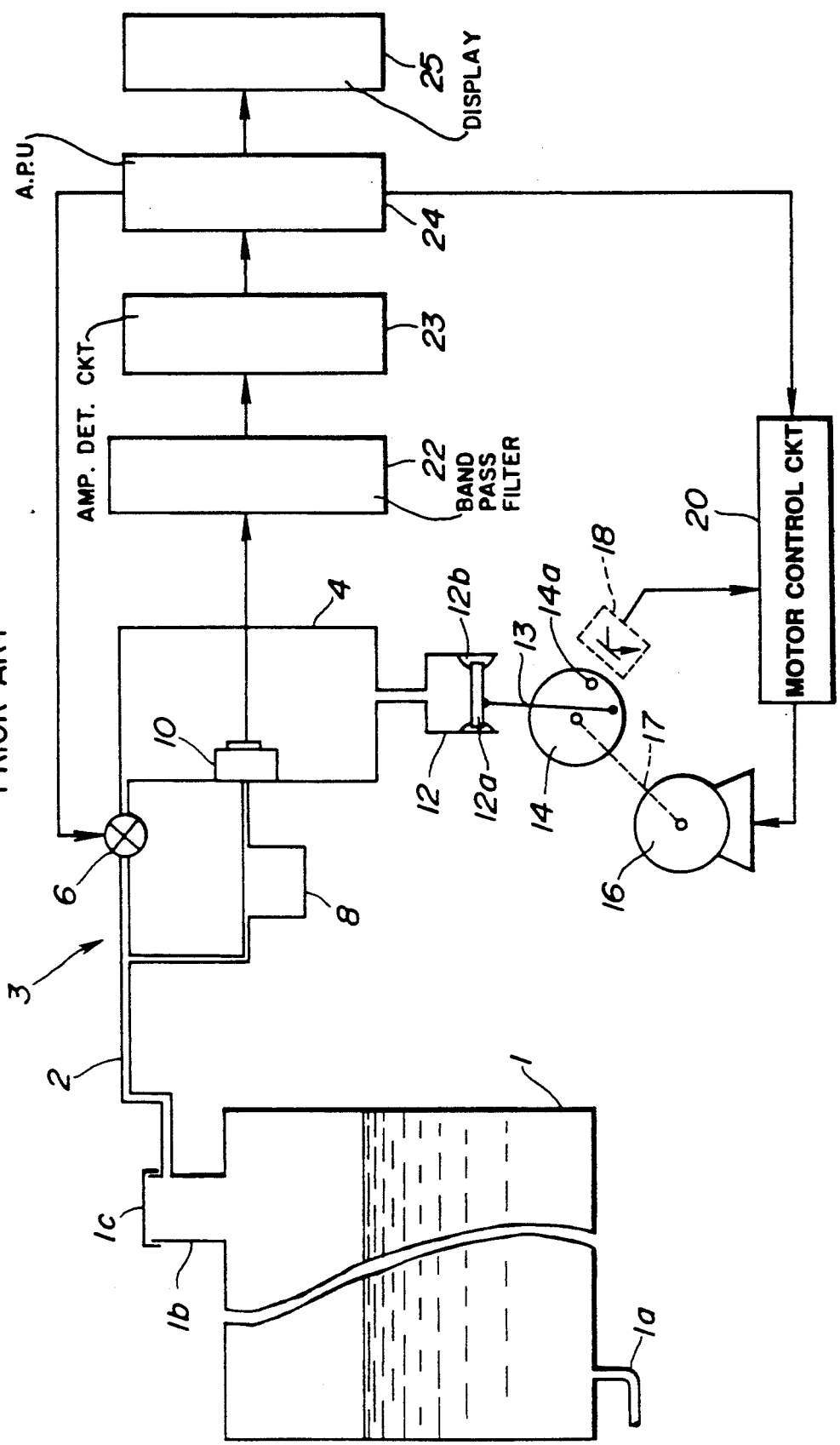
FIG. 1 is a schematic diagram showing the prior art arrangement discussed in the opening paragraphs of the instant disclosure.
Figure 2:
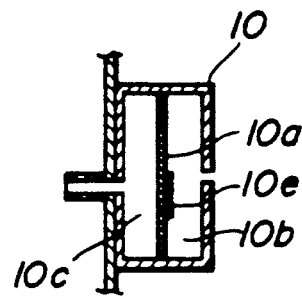
FIG. 2 is a sectional elevation showing the construction of a pressure sensor used in the prior art shown in FIG. 1.
Figure 5:
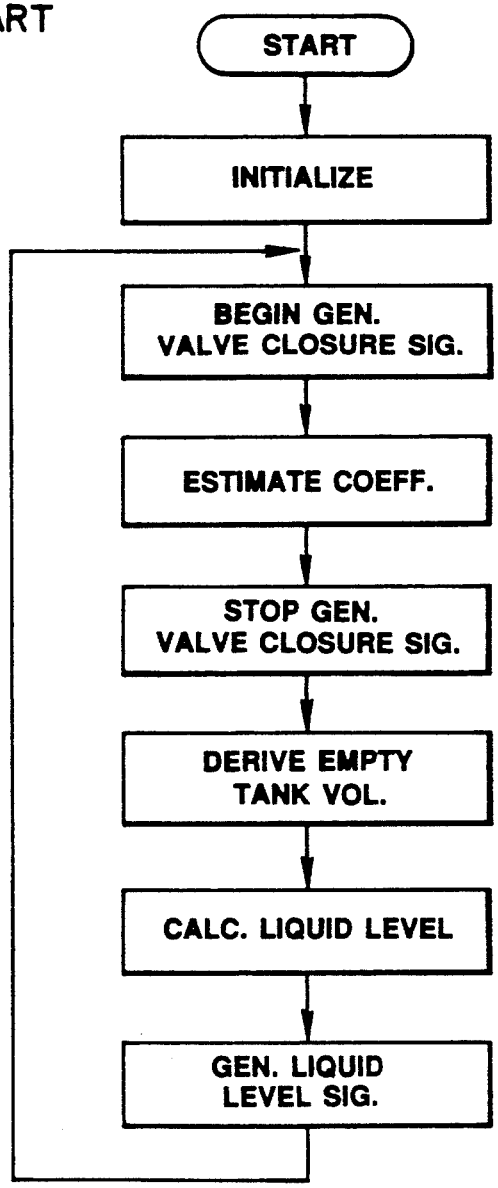
FIG. 5 is a flow chart showing some of the operations performed in connection with the above mentioned prior art.
Figure 3:
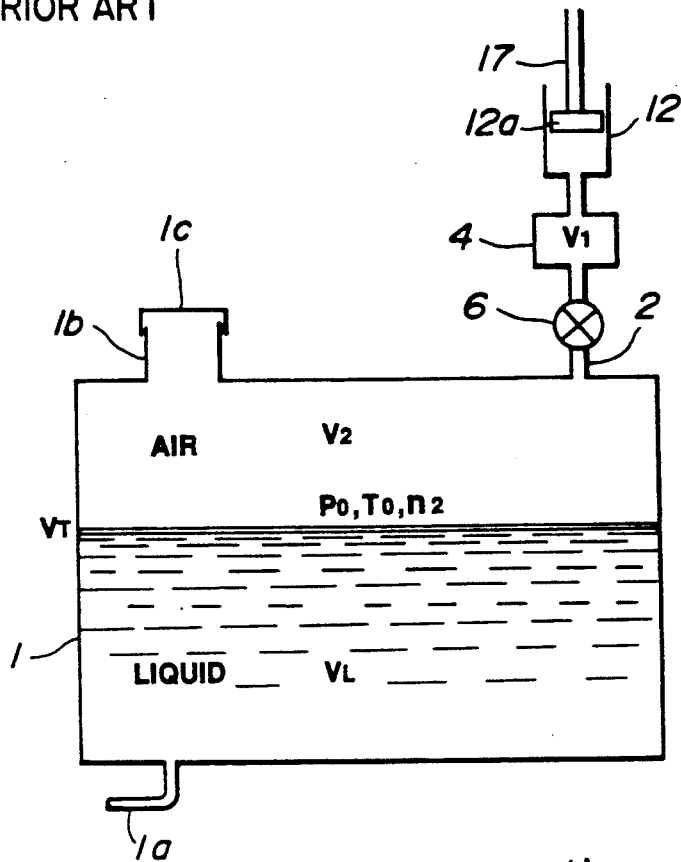
FIGS. 3 and 4 are schematic view depicting the operation of the above mentioned prior art.
Figure 4:
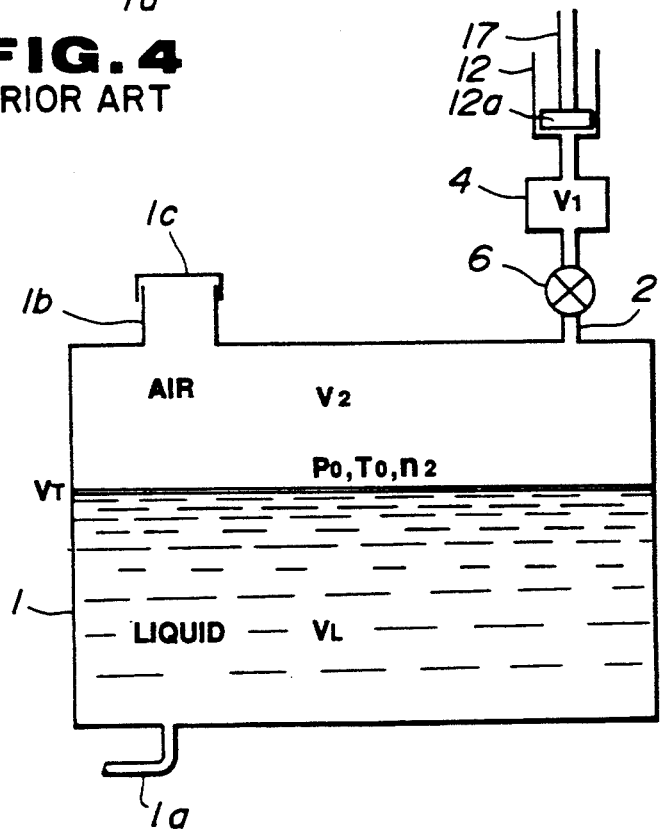
Figure 6:
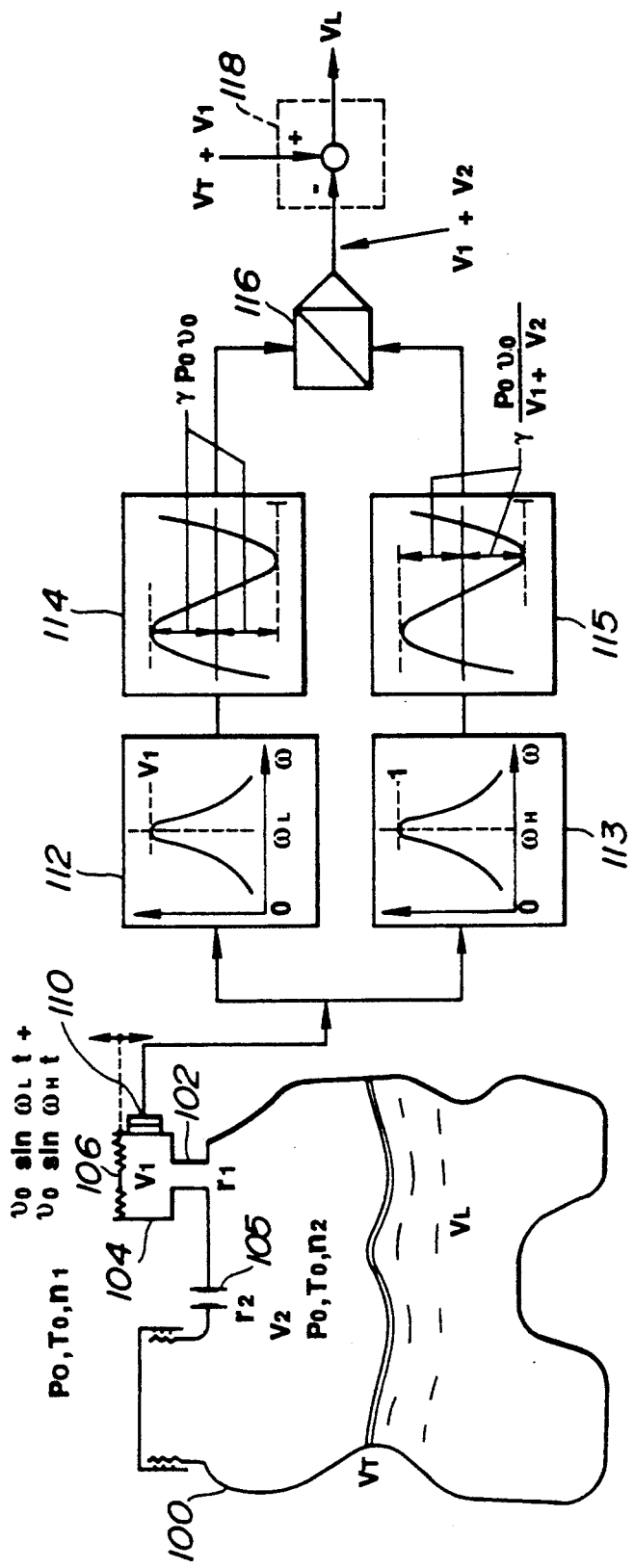
FIGS. 6 and 7 are schematic view showing first and second embodiments of the present invention which are applied to rigid and flexible tanks respectively.

FIG. 6 shows (schematically) a first embodiment of the present invention which is applicable to storage vessels which exhibit a rigid construction and which do not readily undergo a change in volume.

In the arrangement a vessel 100, in which a volume VL of grain, powder, liquid or the like is stored, defines what shall be referred to as a main tank. This tank 100 is connected by way of a connection conduit 102 with a small compensation tank or chamber 104. The main tank 100 is further formed with an air bleed orifice 105 through which the interior of the main tank 100 is fluidly communicated with the ambient atmosphere.

Displacement means 106, such as a piston, bellows diaphragm or the like, is arranged in the upper portion of the compensation chamber 104 and arranged to be motivated in a manner which induces a change in the volume of said compensation chamber 104. In the illustrated arrangement this means takes the form of a diaphragm.

As shown in these figures, strain gauge type pressure sensor 110 is disposed in the compensation chamber 104.

Figure 8:
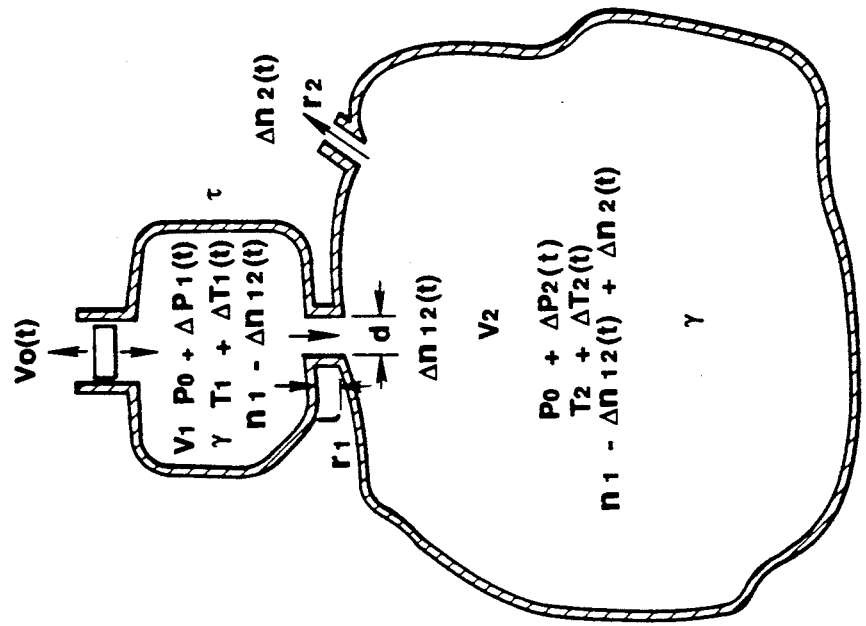
Figure 10:
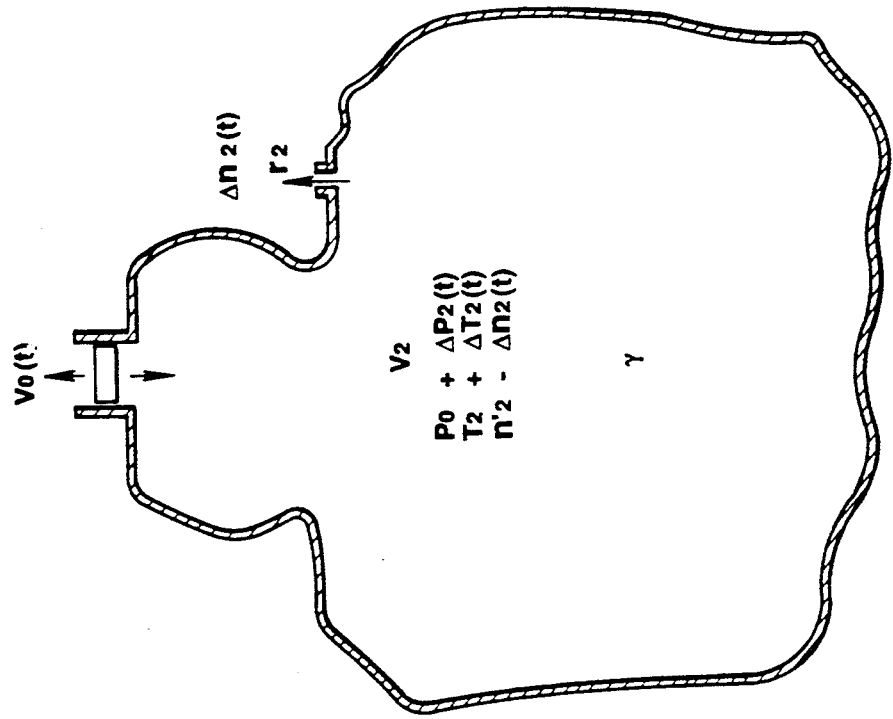

The basic concept on which this embodiment is based, is demonstrated in FIGS. 8 and 10. In the arrangement shown in FIG. 8, the system is such as to include first and second discrete chambers which correspond to the compensation chamber 104 and the main tank 100 and the respective volumes of which are V1 and V2. A conduit (which corresponds to conduit 102) having a predetermined flow resistance r1 is arranged to fluidly interconnect the two chambers.

In this system:

$\gamma$ denotes the specific heat ratio in the compensation chamber and the main tank;

R denotes the gas constant; and $\tau$ denotes thermal time constant.

In the case the structure which defines the chambers is rigid and inflexible, the pressure reduction or the timing of the pressure change does not require any consideration, and as such, the volume displaced by the displacement means vo(t) can be taken as the actual change in volume v(t).

However, in the case the main tank 100 exhibits some flexibility, the pressure change and/or the timing undergo a change which requires consideration. Viz., due to the expansive and contractive flexure of the tank walls the volume V(t) will become larger and smaller than the vo(t).

When v(t)=0 (viz., the tanks exhibits no flexibility) the absolute pressure, temperature and number of mols in the compensation chamber 104 respectively become po, T1, n1 while the corresponding values in the main tank or vessel 100 become Po, T2, n2 respectively. In the event that the measuring environment does not change notably, the provision of the air bleed orifice 105 enables the ambient atmospheric pressure to be transmitted into the compensation chamber 104 and the main tank 100 and therefore permits the pressure therein to approximate the ambient.

When v(t)≠0 (viz., the tank exhibits some flexibility), the status of the absolute pressure, temperature and the number of mols change.

In the tank compensation chamber 104 the pressure changes to Po+Δp1(t), the temperature changes to T1+ΔT1(t) and the mol number changes to n1−Δn12(t).

In the main tank 100 the pressure changes to po +Δp2(t), the temperature to T2+ΔT2(t), and the mol number changes to n2+Δn12(t)-Δn2(t).

Δn12(t) represents the number of mols which are included in the air which flows from compensation chamber 104 to the main tank 100 and Δn2(t) denotes the number of mols which are contained in the air which is bled out of the main tank 100 via the air bleed orifice 105.

For the sake of explanation it will be assumed that:

(1) the gas in the compensation chamber and the main chamber is an ideal gas;

(2) v(t) << {V1, V2};

(3) the amount of heat in the main tank 100 increases and is accompanied by a change in pressure in the compensation chamber 104 and the main tank 100 which is so delayed with the rate that the volume changes, that it can be ignored;

(4) the rate of change of the volume v(t) is accompanied by a similar degree of pressure change in the compensation chamber 104 and the main tank 100; and (5) there are no other phases other than those defined by the air and liquid. Viz., there are no vapor fractions.

Although the value v(t) varies in a non-proportional manner with respect to Δp1(t), Δp2(t), ΔT1(t), ΔT2(t), Δn12(t) and Δn2(t), as V(t) << {V1, V2} po, T1, T2, n1 & n2 are extremely small, it can be deemed to approximate a linear relationship.

Under static conditions, the gaseous body in the compensation chamber 104 and the main tank 100 are such that the relationship between the pressure, temperature, number of mols can be expressed as follows:

$$poV1 = n1RT, \quad poV2 = n2RT2 \quad (12)$$

Further, in accordance with the above assumptions 1, 3, 4 and 5, under dynamic conditions the bodies of air in the compensation chamber 104 and the main tank 100 the following normal linear differential equations can be developed.

$$\Delta p1(t) = \frac{Po}{V1} V(t) + \frac{n1R}{V1} \Delta T1(t) - \frac{RT1}{V1} \Delta n12(t) \quad (13)$$

$$\Delta p2(t) = \frac{RT2}{V2} \Delta n12(t) - \frac{RT2}{V2} \Delta n2(t) \quad (14)$$

$$\frac{d\Delta n2(t)}{dt} = \frac{\Delta p1(t) - \Delta p2(t)}{r1}, \quad \Delta n12(0) = 0 \quad (15)$$

$$\frac{d\Delta n2(t)}{dt} = \frac{\Delta p2(t)}{r2}, \quad \Delta n2(0) = 0 \quad (16)$$

$$\frac{d\Delta T1(t)}{dt} = \frac{1}{\tau} \Delta T1(t) + \frac{T1(g-1)}{V1} \cdot \frac{dV(t)}{dt}, \quad \Delta T1(0) = 0 \quad (17)$$

The flow resistance r (in the above equations r1, r2) are dependent on the length and diameter of the pipe 102 which interconnects the compensation chamber 104 and the main tank 100. Accordingly:

$$r = \frac{1.24 + 1.54 \times 1}{d^2} \left[ \frac{kg \cdot f/cm^2 \times s}{1} \right] \quad (18)$$

In this case the pipe is made of aluminium and has a length 1 which varies between 50–650 [m], and a diameter which varies between 2.0–9.0 [mm].

Further, it can be shown that:

$$V(t) = vo(t) - \Delta V(t) \quad (19)$$

and $$\Delta v(t) = \frac{\Delta V}{V1 + V2 + \Delta V} vo(t) \quad (20)$$

wherein ΔV is a fixed stiffness constant which is dependent on the material shape, volume etc., of the compensation chamber 104 and main tank 100, and Δv(t) is the change in volume which accompanies the displacement vo(t) by the displacement means. The value of ΔV can obtained using a calibration technique of the nature set forth later in connection with equation (36).

Figure 9:
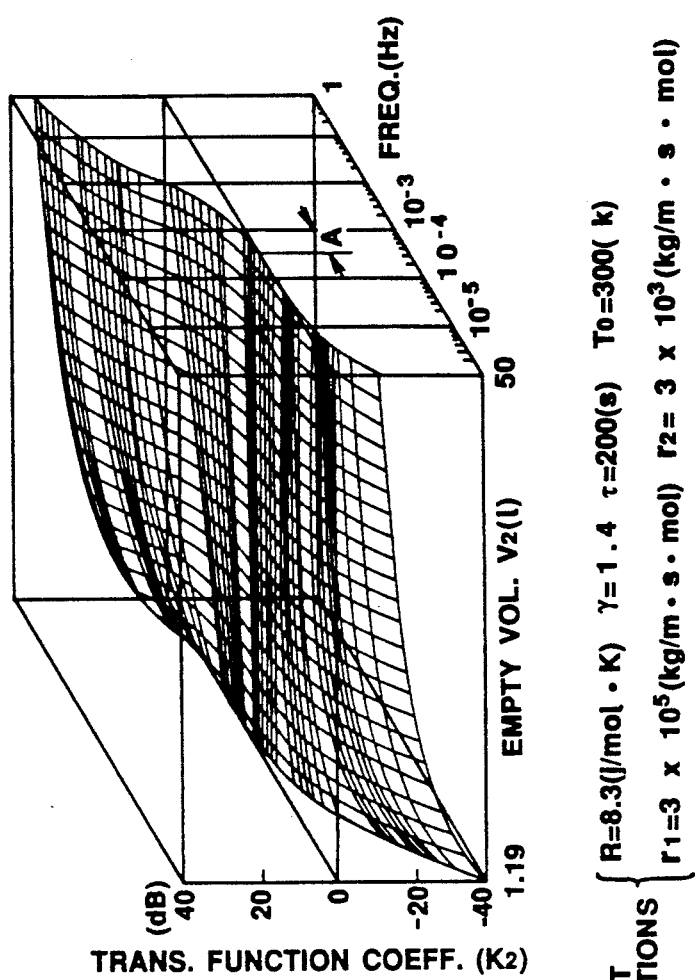
FIGS. 8 to 11 are schematic diagrams and three dimensional maps used in connection with the explanation of the concept on which the first and second embodiments of the present invention are based and to demonstrate the frequency zones which can be used.

Using the Laplace transform on each of equations (12)–(20) from an input of v(t) to an output of Δp1(t), it is possible to derive:

$$\frac{\Delta p1(s)}{V(s)} = \gamma \frac{po}{V1 + V2 + \Delta V} k2(s, r1, r2, V1, V2) \quad (21)$$

$$k2(s, r1, r2, V1, V2) = \frac{1 + s\gamma\tau}{\gamma(1 + s\tau)} \cdot \quad (22)$$

$$\frac{\left(s^2 + \frac{RT_2}{r_2 V_2} + \frac{RT_2}{r_1 V_2}\right)s}{s^2 + \left(\frac{RT_2}{r_2 V_2} + \frac{RT_1}{r_1 V_2} + \frac{RT_2}{r_1 V_2}\right)s + \frac{RT_1}{r_1 V_2} \times \frac{RT_1}{r_2 V_2}} \cdot$$

$$\frac{V_1 + V_2 + \Delta V}{V_1}$$

r2V2/RT2, R1V2/RT2, r1V1/RT1 and r1,V2/RT1 are pressure change time constants. For example, r2V2/RT2 represents the time constant when some of the body of air in the unfilled portion of the main tank 100 (having an absolute temperature T2) is permitted to pass out through the bleed orifice 105 and the pressure in the main tank 100 undergoes a pressure reduction. Although the correction factor k2(s, r1, r2, V1, V2) varies with the change in the volume of the main tank 100, as shown in FIG. 9 depending on the frequency characteristics of k2(s, r1, r2, V1, V2), at a suitable frequency, for example within zone A $4\times10^{-4} - 10^{-3}$ Hz, it becomes approximately constant.

r1<<<r2 (r2 the flow resistance of the air bleed orifice) and accordingly the thermal time constant $\gamma$ and r2{V1+MinV2}/RT2 assume the same value and the angular frequency is such that:

$$\frac{1}{\tau} < \text{and/or} \frac{RT2}{r2\{V1 + \text{Min}V2\}} << \omega << \frac{RT2}{r1\text{Max}V2} \quad (23)$$

Under these conditions the correction factor k2 (s,r1,r2,V1,V2) can be approximated as follows $$|k2(iw, r1, r2, V1, V2)| \approx 1, \quad (24)$$
$$\angle k2(iw, r1, r2, V1, V2) = 0.$$

Therefore under the conditions defined by equation (23) the transmission factor from the input v(t) to the output $\Delta p1(t)$, becomes $\Delta po/V1+V2+\Delta V)$.

If the angular frequency $\omega o$ of the displacement means is induced to follow a Sine curve, and given that:

$$\frac{RT1}{r1V1} << \frac{\omega o}{2p} \quad (25)$$

then it is possible to assume that the pipe 102 is closed. That is to say,

1/the compensation chamber pressure reduction time constant >> displacement means frequency (26)

In the simple tank system as illustrated in FIG. 10, the pipe which connects the compensation chamber 104 and the main tank 100 is illustrated as having a vastly greater diameter whereby the flow resistance r1 between the compensation chamber 104 and the main tank 100 is reduced to a very low value. In accordance with this, the transform function from v(t) to $\Delta p2(t)$, is as shown in equation (21) such that r1 goes to 0, T2=T1, $\Delta p2 - \Delta p1$, V2'=V1+V2.

As a result:

$$\frac{\Delta p2(s)}{v(s)} = \gamma \frac{po}{V2' + \Delta V} k1(s, r2, V2') \quad (27)$$

whereby:

$$k1(s, r2, V2') = \left( \frac{1 + s\gamma\tau}{\gamma(1 + s\tau)} \cdot \frac{\frac{r2 \cdot V2'}{RT2} s}{1 + \frac{r2 \cdot V2'}{RT2} s} \right) \quad (28)$$

However, if we consider the angular frequency $\omega$ we get:

$$\text{Max}\left\{ \frac{RT2}{r2 \cdot V2'} \right\} << \omega \quad (29)$$

Figure 11:
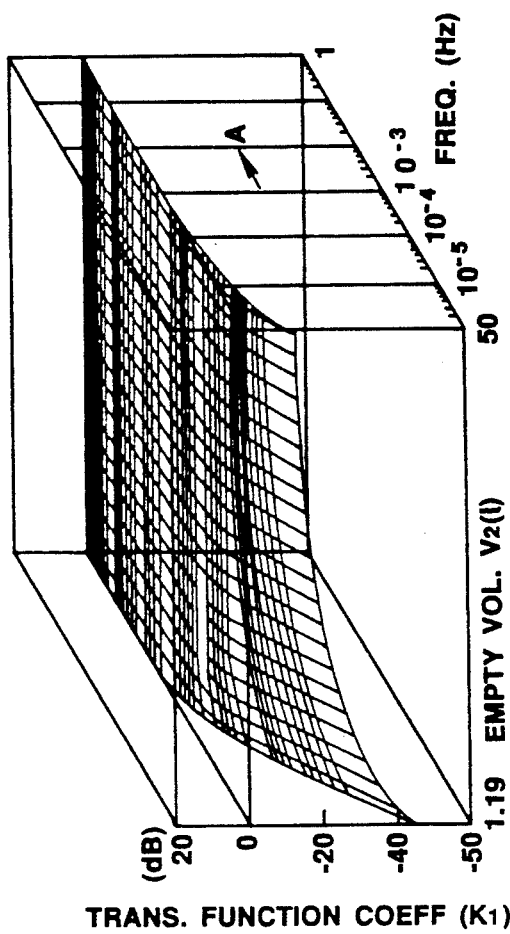

For example, as shown in FIG. 11 if the frequency is above that denoted by A it exceeds $10^{-3}$ Hz. If this frequency is used the correction factor k1(i$\omega$, r2, V3) approximates as follows:

$$|k1(i\omega, r2, V3')| \approx 1, \quad (30)$$
$$\angle k1(i\omega, r2, V3') \approx 0$$

At this time the transmission function becomes $\gamma po/(V2'+\Delta V)$.

Referring back to FIG. 6, the first embodiment of the present invention is such as be able to induce the diaphragm to vibrate simultaneously at two distinct angular velocities $\omega L$ and $\omega H$ ($\omega L < \omega H$) to enable (vo sin $\omega Lt$ + vo sin $\omega Ht$) and (vo sin $\omega Lt$, vo sin$\omega HT$) respectively.

In response to the high angular frequency $\omega H$ the flow resistance r1 of the pipe 102 exhibits an extremely high value (note equation (2e)) and the pressure variations having this frequency are not transferred to the main tank 100. In other words, at this high angular frequency, the communication between the main tank 100 and the compensation chamber 104 is effectively cut-off. Under these conditions, the high frequency pressure changes are limited to the compensation chamber 104. Accordingly, at this frequency the system assumes the single tank arrangement in FIG. 10 wherein volume of the compensation chamber 104 becomes V1, the unfilled volume of the main tank 100 becomes V2, the amount of liquid in the main tank 100 becomes VL and the total volume of the main tank 100 and compensation chamber 104 becomes VT.

Using the pressure changes which occur in the compensation tank 104 under such conditions in equation (29), we obtain:

$$\Delta p1(t) = \gamma \frac{po}{V + \Delta V} |k1| v o \sin(\omega Ht + \phi 1) \quad (31)$$
$$= \gamma \frac{po}{V1} v o \sin\omega Ht.$$

Alternatively, given that the main tank 100 is inflexible, when the high angular frequency $\omega H$ is applied the $\Delta p1(t)$ data can be used in equation (23) as shown below:

$$\Delta p1(t) = \gamma \frac{po}{V1 + \Delta V} |k1| v o \sin(\omega Ht + \phi 2) \quad (32)$$
$$= \gamma \frac{po}{V1 + \Delta V} v o \sin\omega Ht$$

In response to the low angular frequency, the flow resistance of the pipe 102 exhibits a low value and the compensation tank 104 becomes effectively communicated with the main tank 100 by way of a pipe having an extremely large cross-sectional area. Under these conditions, the low angular frequency pressure variations produced in the compensation tank are readily transmitted to the main tank and the pressure changes which occur in the main tank are rendered measurable by the pressure sensor 110 at this frequency.

In this instance also the system depicted in FIG. 10 is deemed to apply.

During the time when the diaphragm is driven at the low angular frequency, the sensed pressure change data $\Delta pi'(t)$ is used as follows:

$$\Delta pi'(t) = \gamma \frac{po}{V1 + V2 + \Delta V} |k1| vo\sin(\omega Lt + \phi 2) \quad (33)$$
$$= \gamma \frac{po}{V1 + V2 + \Delta V} vo\sin\omega Lt$$

Now, if we denote the amplitude of the $\Delta p1(t)$ at the high angular frequency $\omega H$ as A1 and that obtained at the low angular frequency $\omega L$ as A2, then using equations (31) and (32) then it can be shown that:

$$V1 \frac{A1}{A2} = V1 + V2 \quad (34)$$

and the volume of the liquid VL in the main tank can be shown to be:

$$VL = VT + V1 - V1 \frac{A1}{A2} \quad (35)$$

Alternatively, if the main tank is flexible, the value C of the ratio of A1 to A2 becomes:

$$C = \frac{A1}{A2} = \frac{V1 + V2 + \Delta V}{V1} \cdot \frac{|k1|}{|k2|} \quad (36)$$

In this case there are two unknowns $\Delta V$ and $|k1|/|k2|$. These are obtained by a calibration technique wherein two sets of data are derived by sequentially adding predetermined quantities of liquid performing the volume measurement each time an addition is made. The values obtained are then substituted in simultaneous equations (equation (36)) to derive $\Delta V$, $|k1|/k2|$.

$$VL = VT - \left( C \frac{|k1|}{|k2|} V1 - \Delta V \right) \quad (37)$$
$$= VT + \Delta V - C \cdot \frac{|k1|}{|k2|} V1$$

Concrete examples of circuitry for use with rigid and flexible tanks will now be given.

Rigid tank

The circuit arrangement for use with rigid tanks is shown in FIG. 6

In this case if the above theory is applied and the displacement means 106 operated so that (vo sin $\omega$Lt+vo sin $\omega$Ht) wherein ($\omega$L<$\omega$H), the output of the pressure sensor 110 is supplied simultaneously to first and second band pass filters 112, 113. These devices are such as to be set so that the respective center frequencies correspond to $\omega$L and $\omega$H respectively. The outputs of the two band pass filters 112, 113 are respectively supplied to amplitude detection circuits 114 and 115 which exhibit the same gain.

The output of the amplitude detection circuit 114 which is set for the low angular frequency output a signal indicative of $\gamma$Povo while the amplitude detection circuit 115 which is set for the high angular frequency is such as to output a signal indicative of $$\gamma \frac{Povo}{V1 + V2}$$

These signal are fed to a divider 116 wherein they are divided and thus produce a result indicative of V1+V2. A signal indicative of this is fed to a subtracter 118 which is also supplied with a signal indicative of VT+V1. The output of the subtracter 117 is of course indicative of the volume of liquid VL in the main tank 100.

It should be noted that the gain of the band pass filter 112 is set a level which is twice that of the filter 113.

Flexible tank

Figure 7:
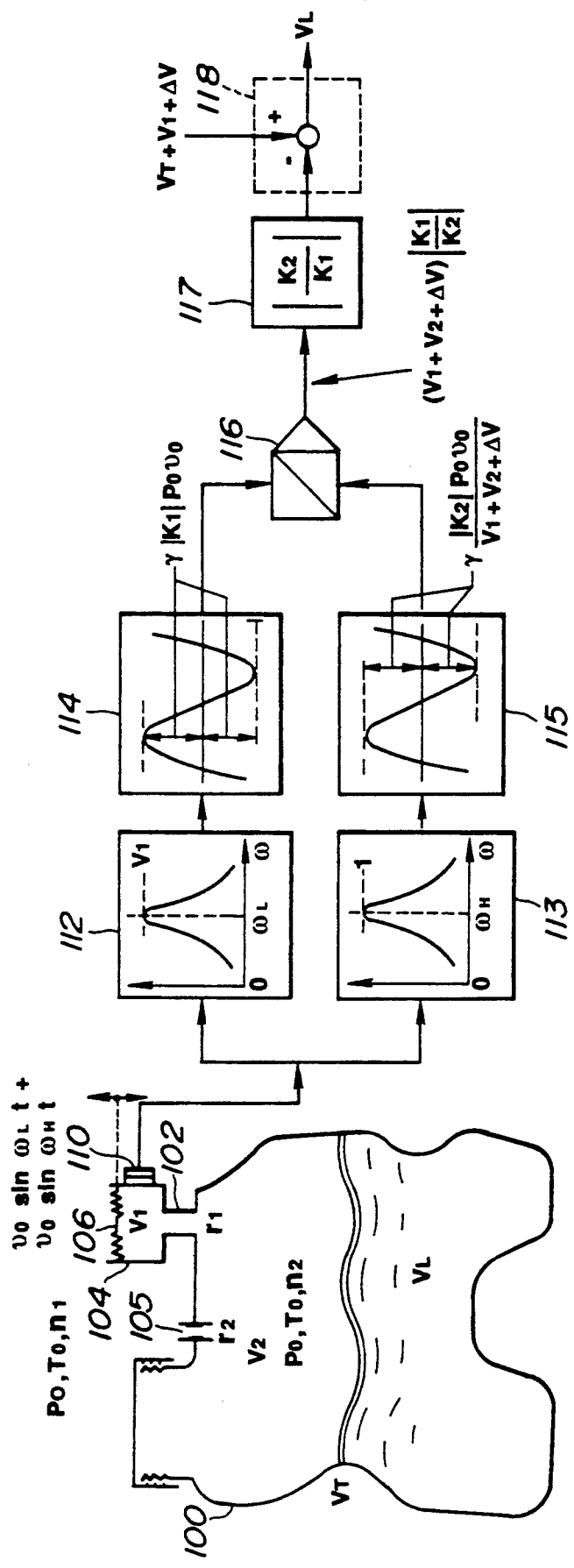

The circuit arrangement for use with flexible tanks is shown in FIG. 7 and defines a second embodiment of the present invention.

Given that the displacement means is operated so that (vo sin $\omega$Lt+vo sin $\omega$Ht) wherein ($\omega$L<$\omega$H) then the output of the amplitude detector circuit 114 is indicative of $\gamma|k|$Povo while that of the circuit 115' is indicative of $$\gamma \frac{|k2|Povo}{V1 + V2 + \Delta V} .$$

The output of the divider 116' therefore becomes $$(V1 + V2 + \Delta V)\left|\frac{K1}{K2}\right|.$$

An amplifier 117 which is operatively interposed between the divider 116' and the subtracter 18 is arranged to amplify the signal from the divider by a factor of $$\left|\frac{K2}{K1}\right|$$

which is derived from the above described calibration.

Figure 23:
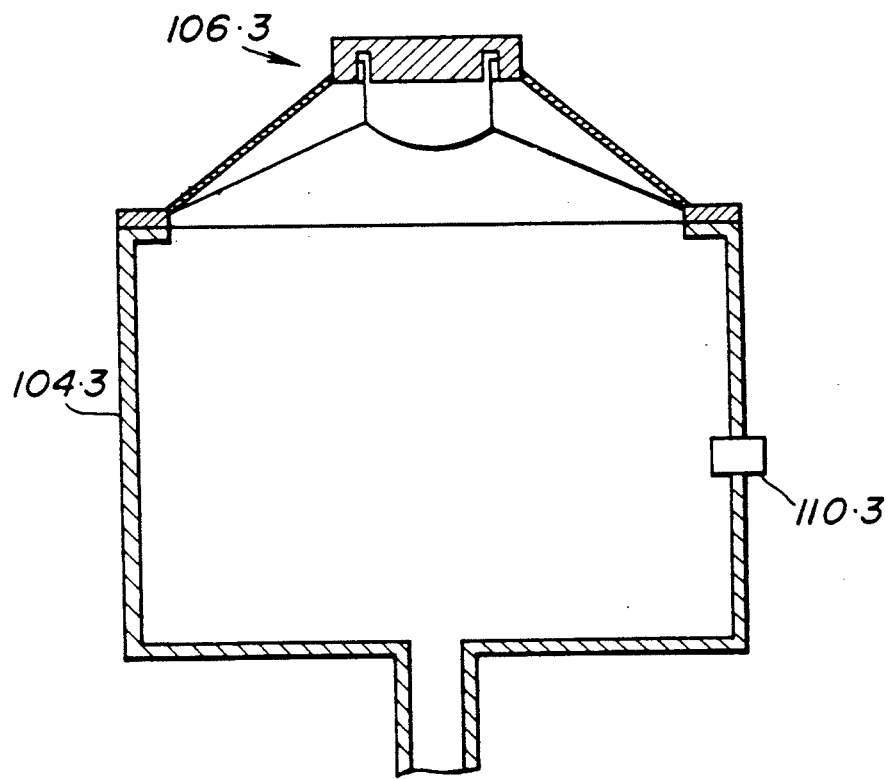
FIG. 23 is a sectional view showing a variant of the first and second embodiments which features use of a speaker and a microphone.

FIG. 23 shows a third embodiment of the present invention wherein the displacement means comprises a speaker 106.3 and the pressure sensor comprises a microphone 110.3. As will be appreciated the speaker has a diaphragm of the nature disclosed in connection with the arrangements shown in FIGS. 6 and 7, and the microphone 110.3 inherently is responsive to pressure waves, the combination of the two devices presents a lightweight and compact arrangement.

Figure 12:
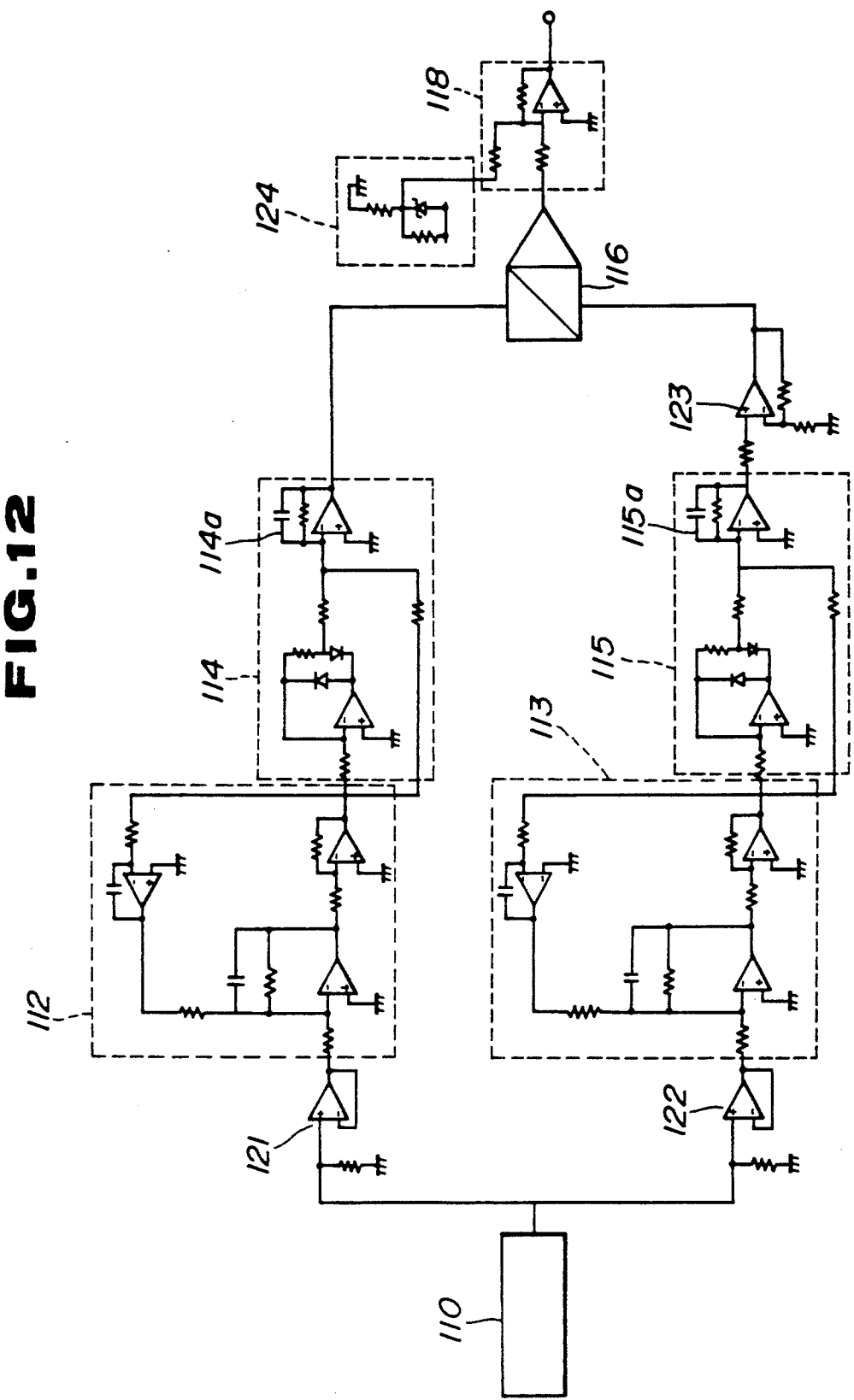
FIG. 12 is a circuit diagram showing an example of the circuitry which can be used in connection with the first embodiment of the present invention.

FIG. 12 shows an actual example of a circuit of the nature illustrated in block diagram form in FIG. 6. That is to say a circuit which is arranged for use with rigid vessels.

In this arrangement the output of a microphone 110 is fed simultaneously to first and second buffer circuits 121, 122. These circuits 121, 122 are connected to the inputs of the first and second band pass filters 112, 113. In this circuit arrangement is possible to use band pass filters of the nature which enable the Q value of the same to be selectively adjusted.

The amplitude detecting circuits 114, 115 are provided with smoothing circuits 114a, 115a which remove the noise peaks while the second amplitude detection circuit has an amplifier 123 connected to its output.

A standard value generating circuit 124 includes a shunt regulator which permits the output to adjusted to a value indicative of the value VT+V1.

Figure 13:
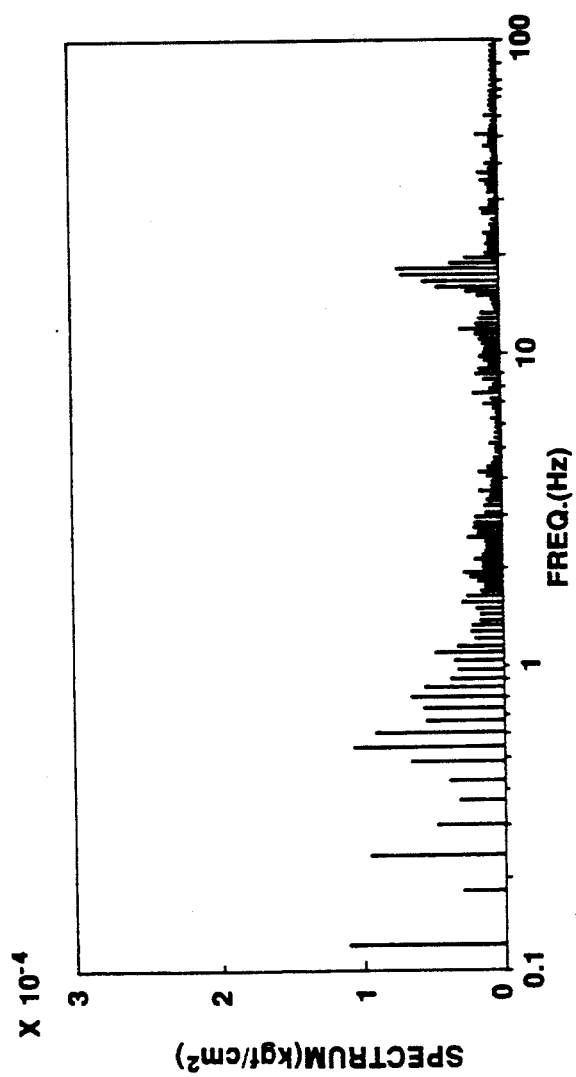
FIG. 13 is a graph which demonstrates the noise spectrum which occurs tends to occur in automotive fuel tanks.

FIG. 13 shows graphically the noise spectrum which, tends to occur in the fuel tank of an automotive vehicle during operation of the same. As will be appreciated, low noise levels occur in the 1-15 Hz and >20 Hz ranges.

Figure 14:
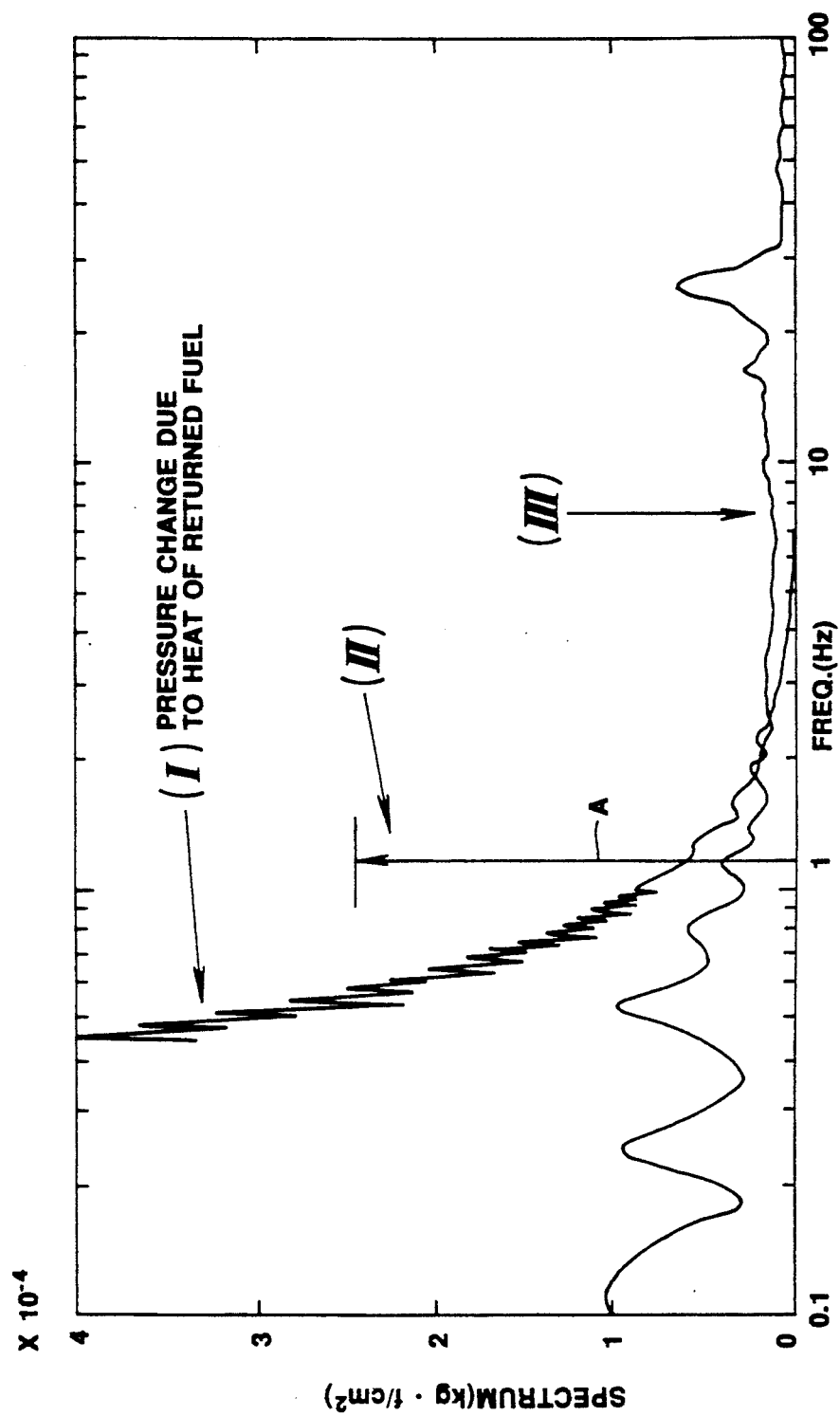

Further, as shown in FIG. 14 in the case excess fuel is returned to the fuel tank such as takes place with fuel injected engines, the noise (I) which is caused by the heat contained in the fuel which comes back from the engine, the vibration which is applied externally to the fuel tank walls and the sloshing of the fuel within the tank (III) are such that if the magnitude of the volume change (II) induced at a given frequency by the displacement means, is A. This data is such as indicate that it is possible to select frequencies in 1-25 Hz and >30 Hz ranges.

By taking all of the above data into consideration it is deemed appropriate to select the angular frequencies the 1-15 Hz and >30 Hz ranges as it is possible to achieve a good S/N ratio signal in same.

In order to determine the length and diameter of the pipe 102 which interconnects the main tank 100 and the compensation chamber 104 it is necessary to consider the pressure transmission cut-off frequency.

Experiments were conducted using a glass tank having a capacity of 7.9 [l], a pressure compensation chamber having a capacity of 200 [cc], and a strain gauge type pressure sensor which was disposed in the compensation chamber. Pipes having a diameter which varied between 2.0-9.0 [mm] (1.0 [mm] increments) and a length which varied between 5.0-65.0 [cm] (5.0 [cm] increments) were then used and the flow resistance data shown in FIGS. 15 and 16 derived.

The relationship between the time constant $\tau$ and the flow resistance r is given by the following equation:

$$r = \tau \frac{RT_0}{V_0} \qquad (38)$$

wherein:
Vo denotes the content of the tank;
To denotes the absolute temperature of the gas in the tank; and
R denotes the gas constant.

Figure 15:
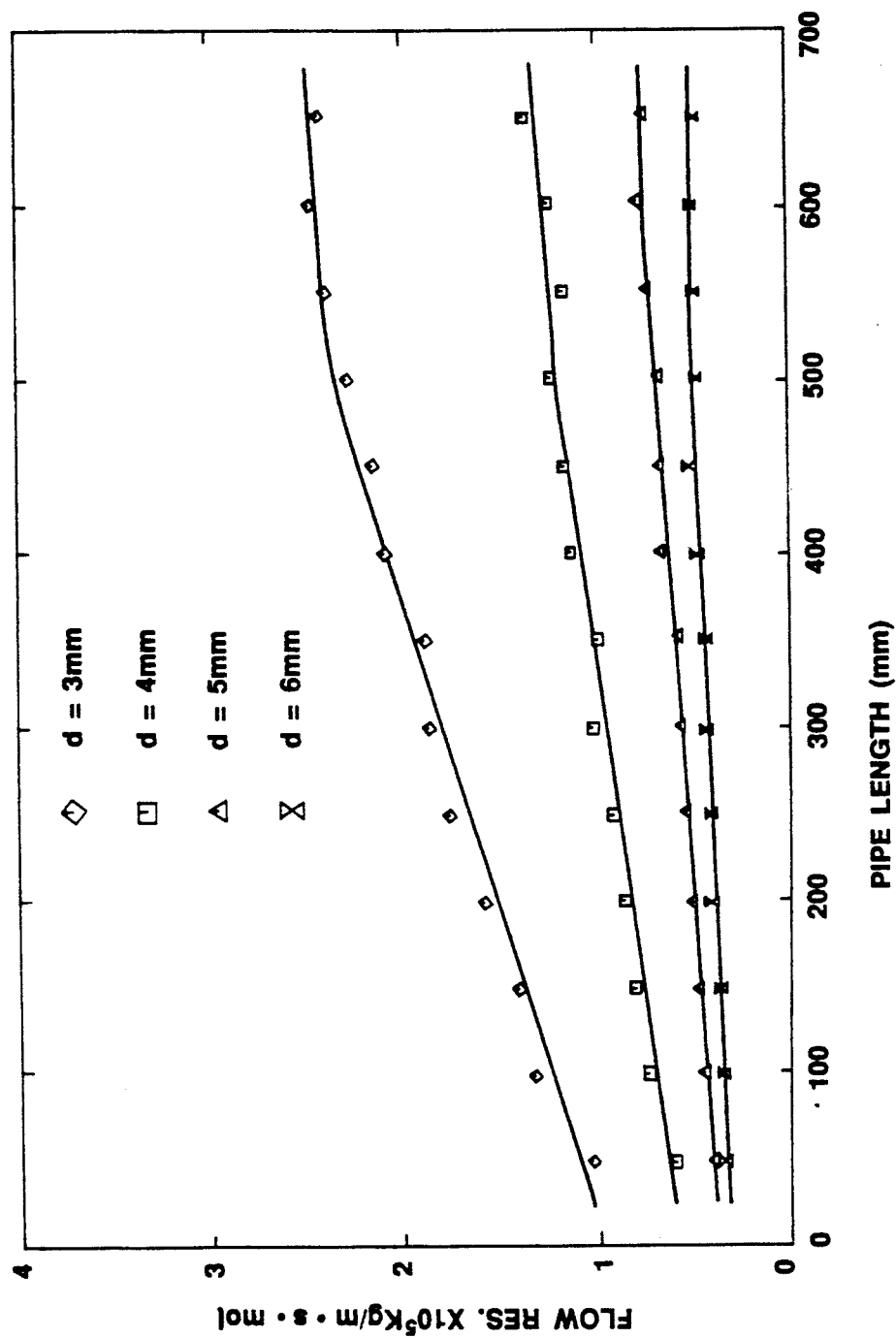
FIGS. 15 and 16 show the results of experiments conducted in order to determine the appropriate dimensions of the pipe which connects the main tank with the compensation chamber of the present invention.

FIG. 15 demonstrates the change in flow resistance characteristics with the change in length of the pipe. As will be appreciated, the flow resistance varies with an essentially linear relationship with the change in length. Accordingly, it is possible to express this relationship as:

$$r = a0 + a1 \cdot l \qquad (39)$$

Figure 16:
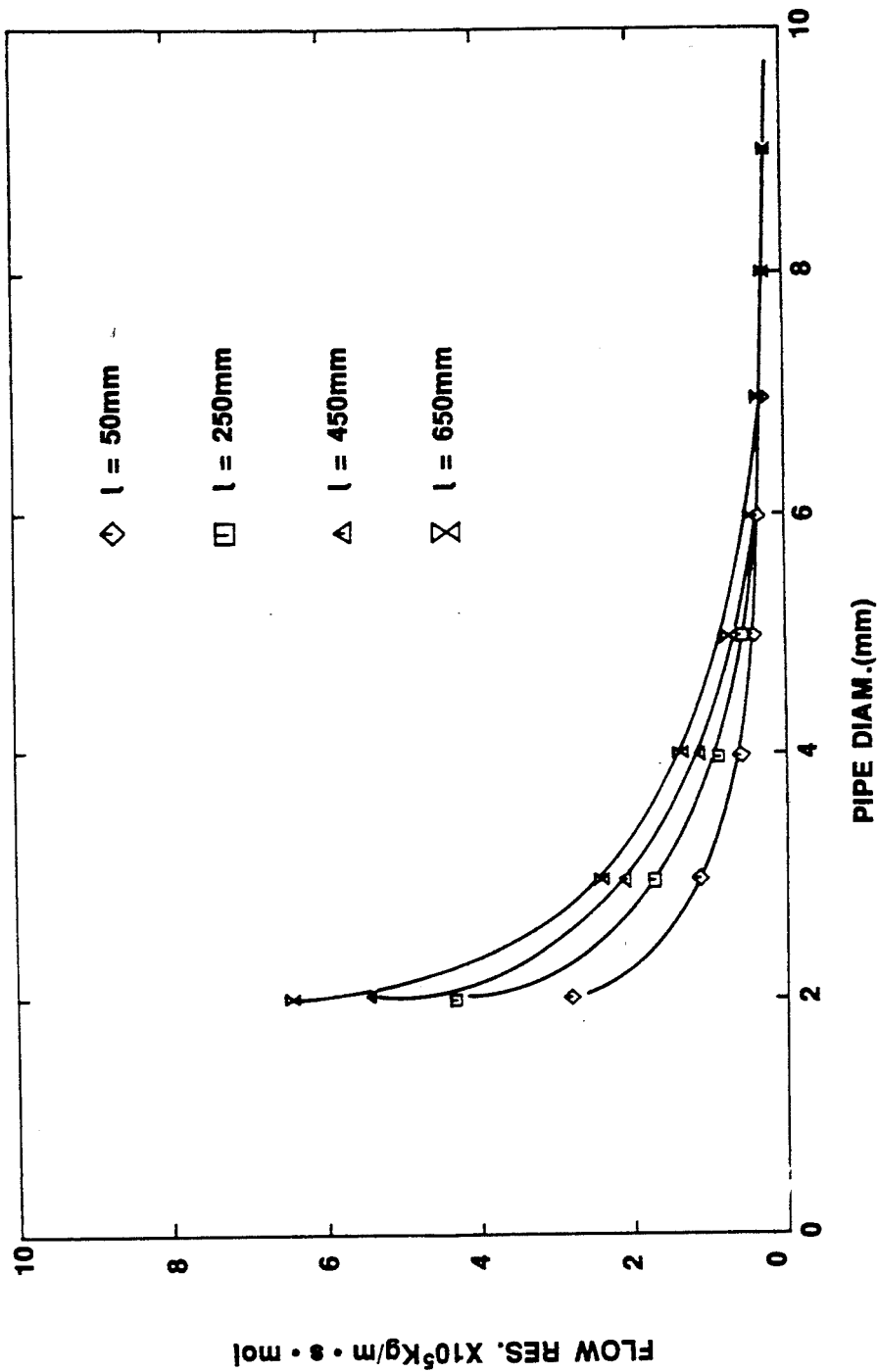

On the other hand the data in FIG. 16 is such as indicate that the flow resistance varies with the square of the diameter. Accordingly, it is possible to express this relationship as:

$$r = a0 + \frac{1}{d} a1 + \frac{1}{d^2} a2 + \frac{1}{d^3} a3 \qquad (40)$$

In this equation the first order least square, second order least square, third order least square . . . are applied to derive a ratio of the standard partial differences, it can be shown that r varied with the inverse of the square of the diameter.

From the above, a model depicting the flow resistance r in terms of l and d can be expressed as follows:

$$r = \frac{a + b \cdot l}{d^2} \qquad (41)$$

wherein the constants a and b used in the least squares are set as follows:

$$r = \frac{1.24 + 1.54 \cdot l}{d^2} \; [\text{kg/m} \cdot \text{mol} \cdot s] \qquad (42)$$

Figure 17:
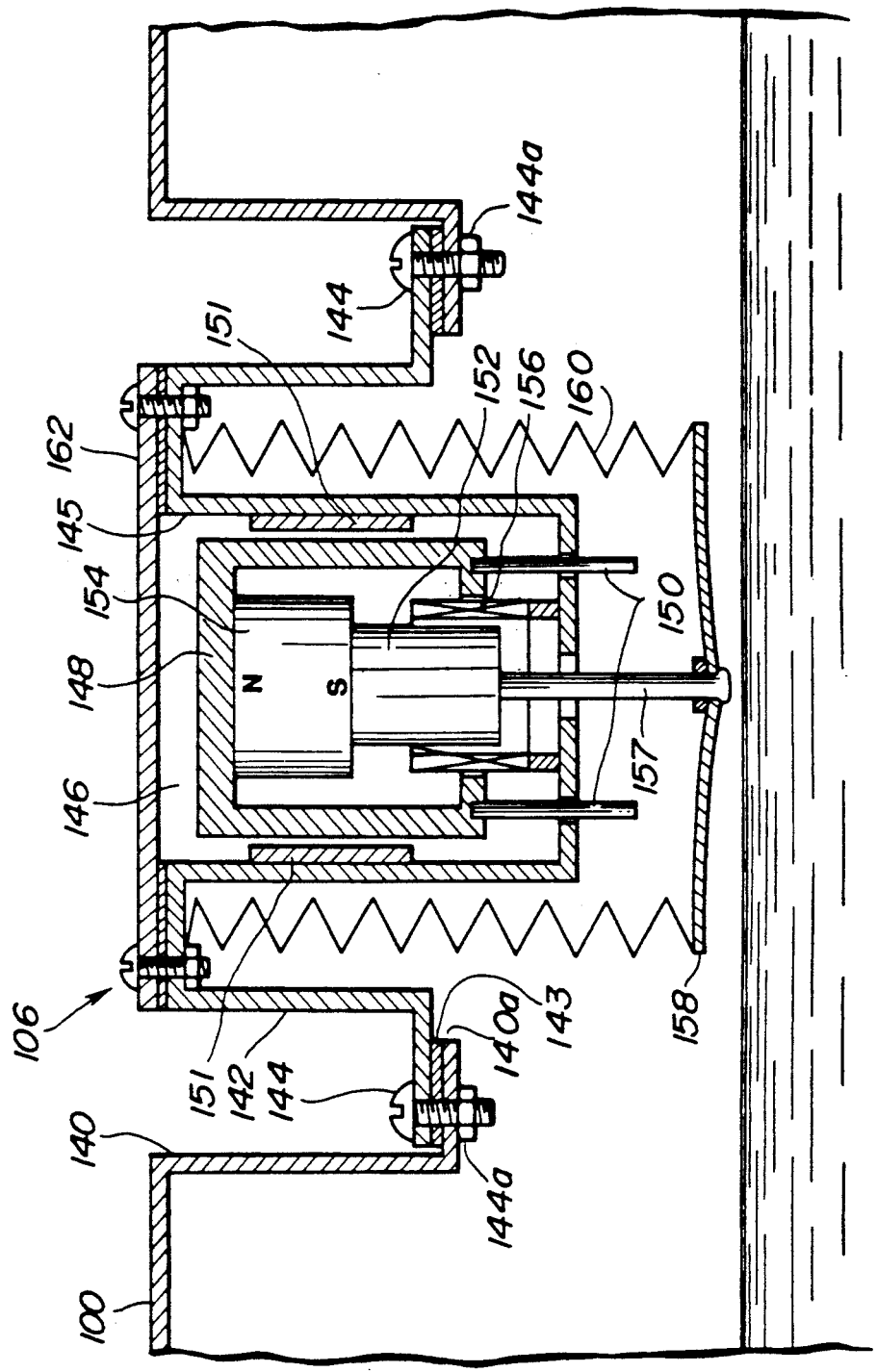
FIG. 17 is a sectional view showing an a bellows type arrangement which is used in a third embodiment of the present invention.

FIG. 17 shows a example of the construction of a displacement means 106. In this arrangement a recessed portion 140 is formed in the upper surface of the main tank 100. The center of this recess is formed with an opening 140a over which a housing structure 142 is disposed. A packing 143 is sandwiched between a radially extending flange portion of the housing structure 142 and a radially inwardly extending flange portion defined about the opening 140a in a manner to define a hermetic seal. The housing structure 142 is arranged to be detachably connected to the housing by way of screws 144. In this instance the nuts 144a which cooperate with the screws are bonded or otherwise fixed to the inner surface of the tank 100.

The housing structure 142 includes a well portion 145 in which defines a yoke housing 146. A first hollow yoke 148 is reciprocatively disposed in the well. Parallel guide rods 150 which extend from the lower end of the first yoke are arranged to be slidably received in apertures formed in the lower wall of the housing structure 142. Guide walls 151 are provided on the inner surface of the well in the illustrated positions.

A second yoke 152 is connected to the inner wall of the upper end of the first yoke 148 by way of a permanent magnet 154. A solenoid coil 156 is fixedly supported on the bottom of the well and arranged to surround the lower end of the second yoke 152.

An actuator rod 157 is arranged to extend from the bottom of the second yoke 152 and pass through an aperture formed in the bottom of the well. An essentially circular plate 158 is connected to the end of the actuator rod 157 which projects into the interior of the main fuel tank 100. A bellows 160 extends from the outer periphery of the circular plate 158 into an annular recess defined at the top of the housing structure 142. The upper end of the bellows 160 is sealing connected to the inner surface of the housing structure 142 by way of screws which, in this embodiment, also secure a cover member 162 to the top of the housing structure in a manner which hermetically seals the upper end of the well and closes the yoke housing 146.

The solenoid coil 156 is connected to an external control arrangement via lead lines (neither illustrated in this figure).

Figure 18:
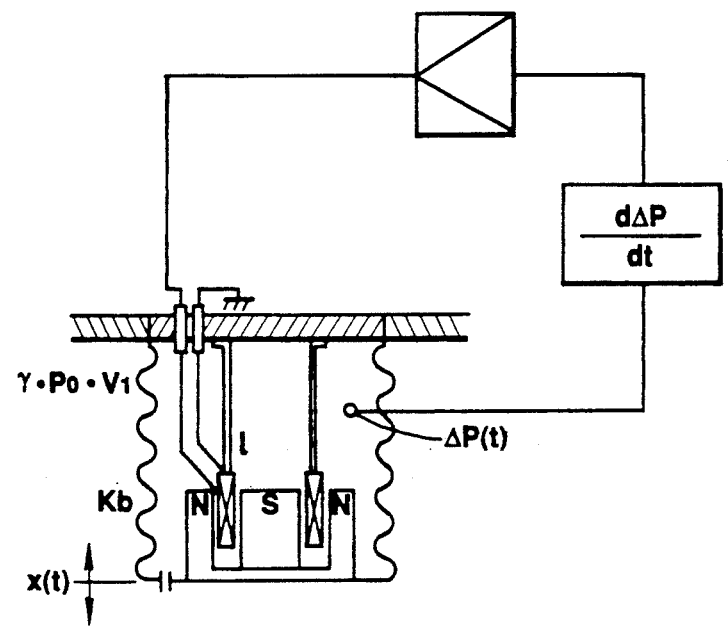
FIG. 18 shows the third embodiment in schematic form.

The operation of this embodiment will now be discussed in connection with FIGS. 18 and 19. As shown in the schematic layout of FIG. 18, a pressure sensor is disposed in a suitable position in a manner to be exposed to the pressure fluctuation which occur within the bellows. Further, an air bleed orifice is arranged to permit limited communication between the interior of the bellows and the main tank 100.

The pressure sensor 110 is illustrated in this figure as being arranged to supply its output to a differential circuit which is in turn connected to the solenoid coil by way of an amplifier.

Figure 19:
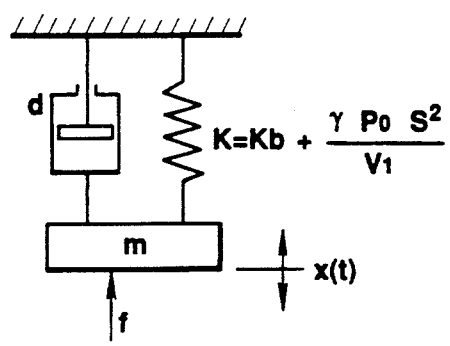
FIG. 19 is a model which depicts the arrangement of the third embodiment.

FIG. 19 depicts the above system as a model wherein:

K is the spring constant of the air spring defined by the air retained in the bellows;

Kb is the spring constant of the bellows per se;

x is the displacement of the bellows;

m is the combined mass of the first and second yokes the permanent magnet;

d is dynamic spring constant for the air in the bellows;

f is the force which is applied to the bellows;

G is gain of the amplifier;

B is the flux density of the solenoid;

I is a magnetic flux of the permanent magnet divided by the length of the solenoid coil;

i is the current which is passed through the solenoid coil;

L is a inductance of the solenoid coil

R is the resistance of the solenoid coil;

Vi is the voltage applied to the solenoid coil by the amplifier; and

V is the actual voltage which is applied to the solenoid coil.

Considering the model shown in FIG. 19 it is possible to express the relationship of the above listed parameters as follows:

$$m\frac{d^2x}{dt^2} + d\frac{dx}{dt} + Kx = f \quad (43)$$

$$f = BIi \quad (44)$$

$$L\frac{di}{dt} + Ri = V \quad (45)$$

$$V = Vi - BIx \quad (46)$$

$$Vi = Gx \quad (47)$$

Theoretically, it is possible to express the model in the above manner, however in actual fact as there are a number of different conditions it becomes necessary to make the following assumptions:

1) In equation 8a if L reduces to a few mH then it can be disregarded and it can be expressed as:

$$i = \frac{V}{R} \quad (48)$$

2) the spring constant K can be expressed in terms of the bellows air spring Kb as follows:

$$K = Kb + \gamma\frac{P_oS^2}{Vb} \quad (49)$$

wherein:

Po is the atmospheric air pressure;

S is the effective cross sectional area of the bellows;

Vb is the capacity of the bellows.

Considering the maximum compression characteristics of the bellows the value of K can be deemed to exhibit the characteristics shown in FIG. 10. Accordingly, the value of K x in equation (6a)

$$K(x) = \left(Kb + \gamma\frac{P_oS^2}{Vb}\right)\left(\frac{2X\max}{\pi}\tan\left(\frac{\pi x}{2X\max}\right)\right) \quad (50)$$

wherein Xmax is the bellows maximum compression limit whereby equation (6a) can be expressed $$m\frac{d^2x}{dt^2} + d\frac{dx}{dt} + K(x) = f \quad (51)$$

3) In equation 10a there is a limit to the voltage of the amplifier gain G and the characteristics shown in FIG. 7 are assumed.

Following this assumption, by using $\tan^{-1}$ the characteristics in FIG. 7 can be approximated and therefore:

$$Vi = \frac{2V\max}{\pi}\tan^{-1}(Gx) \quad (52)$$

wherein Vmax is the voltage developed by the amplifier.

Considering the content of equations 6a' 7a'9a and 19a' it is possible to develop the following:

$$m\frac{d^2x}{dt^2} + \left(d + \frac{B^2I^2}{R}\right)\frac{dx}{dt} - \frac{2BIV\max}{Tp}\tan^{-1}(Gx) + \quad (53)$$

$$\left(Kb + \gamma\frac{P_oS^2}{Vb}\right)\left(\frac{2X\max}{\pi}\tan\left(\frac{\pi x}{2X\max}\right)\right) = 0$$

From equation (51) it is possible to determined the resonance frequency (f) in the event that the bellows is subject to simple vibration. Viz:

$$f = \frac{S}{2\pi}\sqrt{\frac{\gamma Po}{mV}} \quad (54)$$

From this equation it can be seen that by increasing the value of V the frequency at which resonance occurs can be lowered. Accordingly, a further embodiment of the present invention shown in FIG. 20 features the provision of a top hat shaped cover member 162' which is so shaped as to increase the volume of the yoke housing and hence reduce the resonance frequency thereof.

Figure 20:
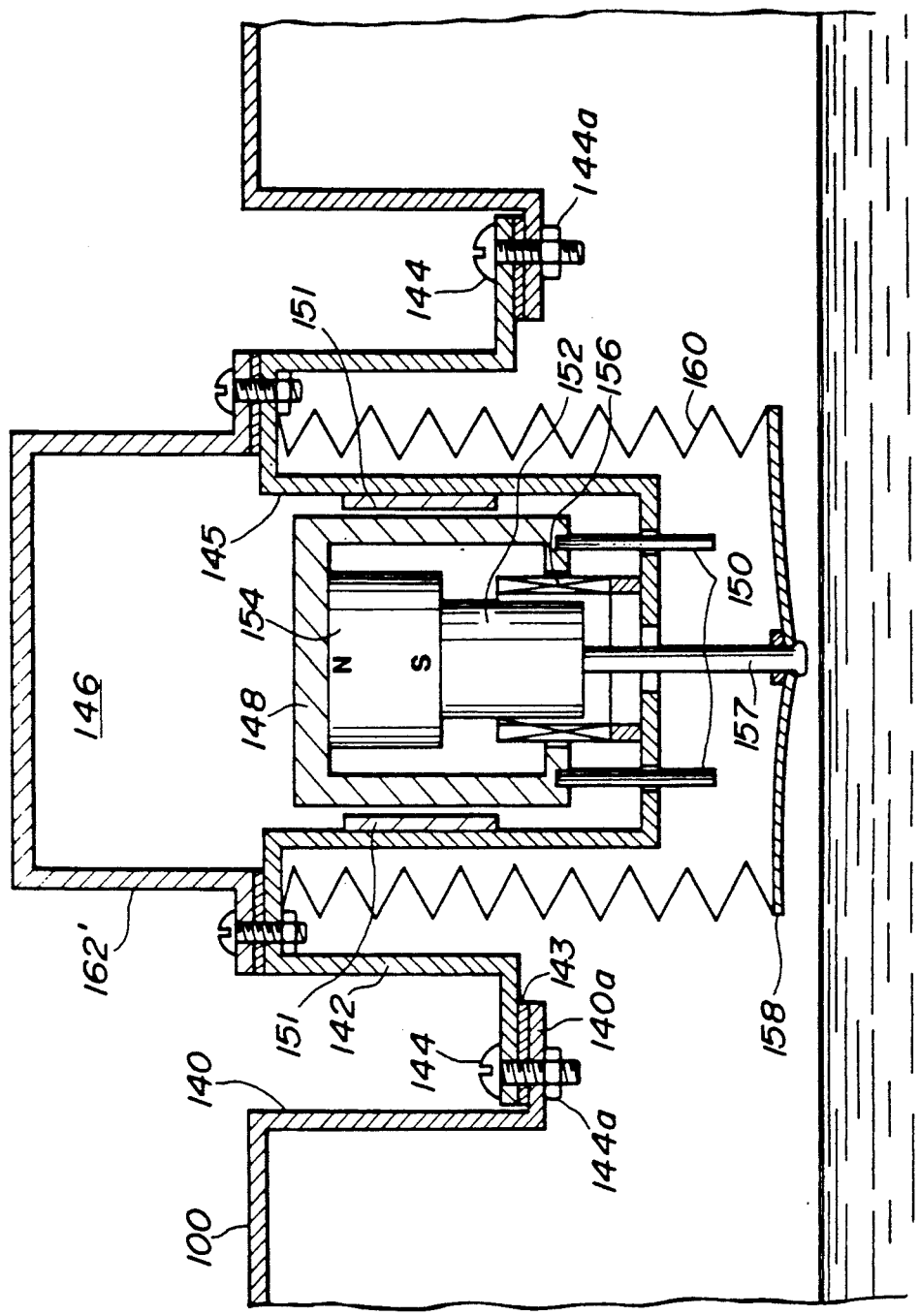
FIG. 20 is a sectional view showing a bellows arrangement which characterizes a fourth embodiment of the present invention.
Figure 21:
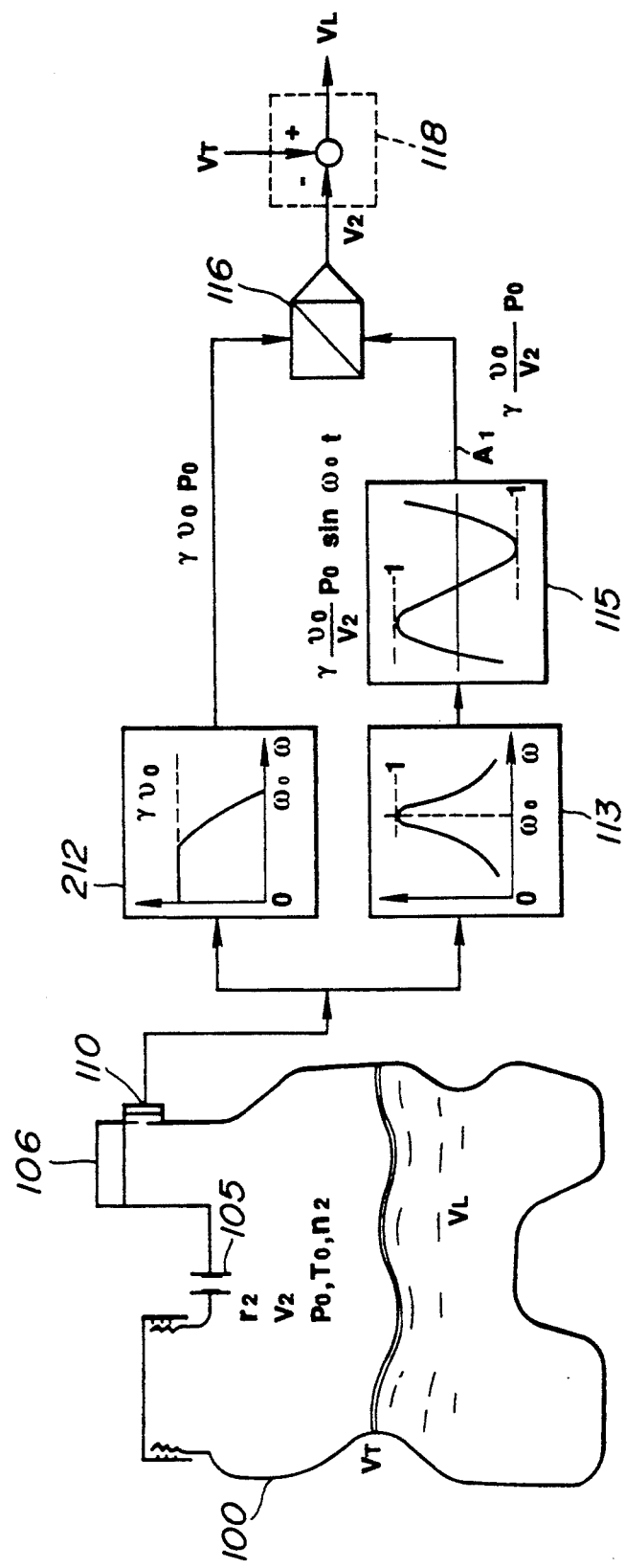
FIG. 21 is a schematic view showing the circuit arrangement which can be used with the third and fourth embodiments in the event that the main tank is rigid.

FIG. 21 shows a circuit arrangement for use with the arrangements shown in FIGS. 17 and 20. This circuit is similar to that shown in FIG. 6 for example but which features the replacement of the band pass filter and the amplitude detecting circuit by a single low pass filter 212.

The operation of this embodiment is such that when the displacement means is operated in a manner wherein the bellows are induced to expand and contract at vo sin ωo t, the changes in pressure as detected by the pressure sensor are converted into an electrical signal. This signal is supplied simultaneously to the low pass filter 212 and the band pass filter 113. The latter element is set to that its center frequency corresponds to the angular frequency ωo and to have an amplification ratio . of 1. The low pass filter 212 output a signal indicative of γ vo Po while the band pass filter 113 is such as to output a signal indicative of γvo/V2 Po ωo t to the amplitude detection circuit 115. The latter mentioned circuit converts the input into an output indicative of γ vo/V2 Po.

The divider 116 converts the inputs from the low pass filter and the amplitude detection circuit into a signal indicative of V2 (the unfilled volume of the main tank).

The subtracter 118 is arranged to receive a data input indicative of the total volume VT of the main tank. Via subtraction the amount of fuel (i.e. the contents of the main tank are derived and outputted in the form of a signal indicative of VL.

In this embodiment the amplitude detecting circuit 115 is provided with a smoothing circuit for suppressing the effect of noise in the pressure signal produced by the pressure sensor. However, it should be noted that this provision can be omitted if preferred.

Figure 22:
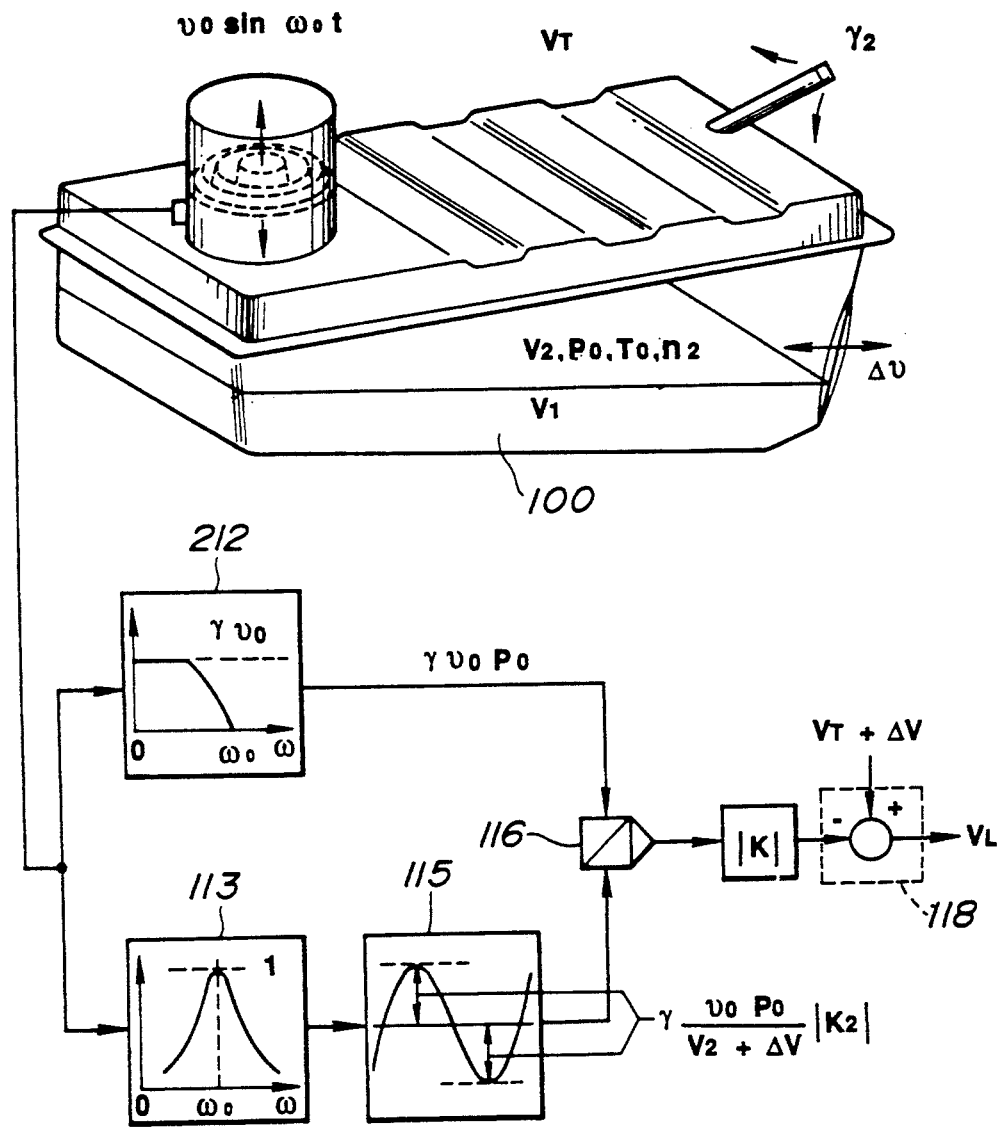
FIG. 22 is a schematic view showing the circuit arrangement which can be used with the third and fourth embodiments in the event that the main tanks exhibits a degree of flexibility.

In the case the fuel tank exhibits a degree of flexibility then the arrangement illustrated in FIG. 22 is used. As will be noted this arrangement is essentially the same as that used in connection with the rigid tank arrangement shown in FIG. 21 but features the provision of a correction stage between the divider and the subtracter, and the inclusion of a factor $\Delta V$ with the total volume value VT.

In order to achieve the requisite calibration for the instant correction the following equation is utilized:

$$C = \gamma \frac{Pov}{A1} = \frac{V2 + \Delta V}{|K1|} \quad (55)$$

Figure 24:
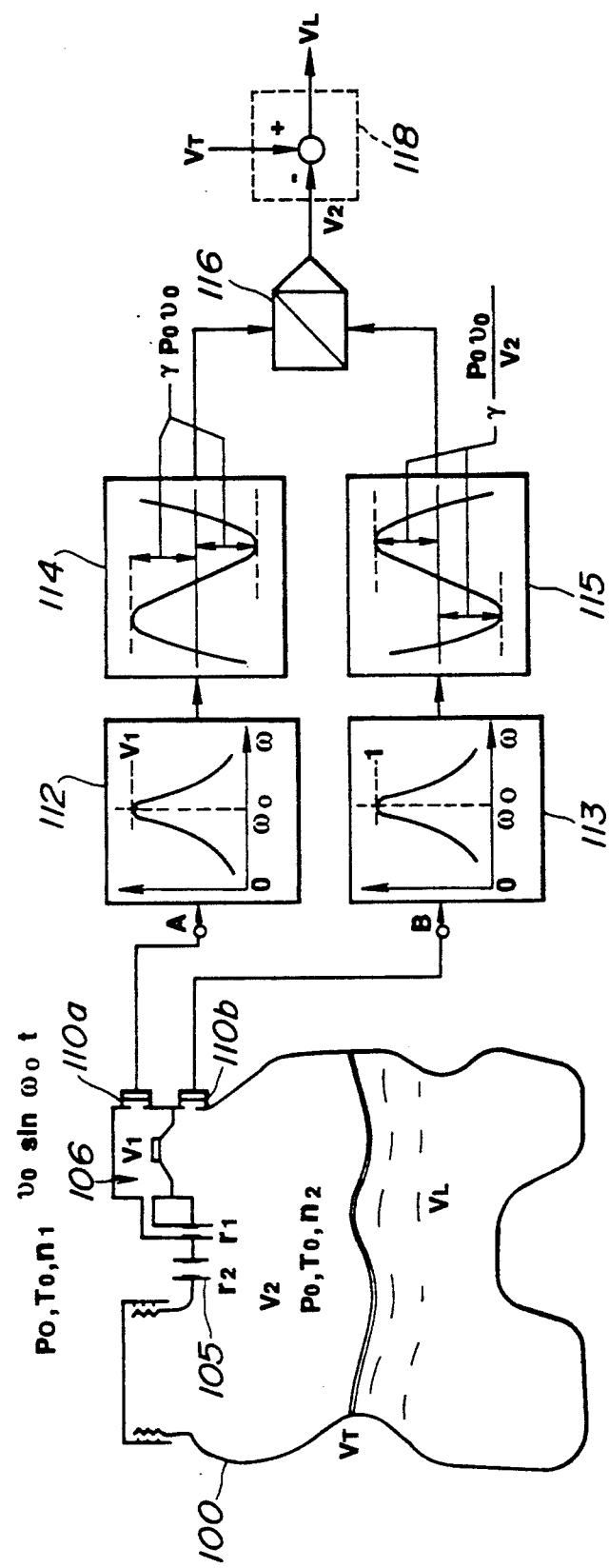
FIG. 24 is a schematic view showing a two pressure sensor arrangement which characterizes a fifth embodiment. of the present invention and the circuitry associated therewith.

In this equation there are two unknowns: $\Delta V$ and $|k1|$. These values are obtained via calibration in a manner similar to that set forth in connection with equation (36). Further, the amount of liquid VL can be derived using:

$$VL = VT + \Delta V - C \cdot |k1| \quad (56)$$

wherein:

$\Delta V$ is the pressure induced deflection correction amount (viz., the previously mentioned stiffness constant); and $C \cdot |k1|$ is a correction amount for the change in driving frequency. v FIG. 24 shows an embodiment of the present invention wherein a speaker is used as the displacement means and is arranged in a manner to act as a partition which separates the main tank 100 and the compensation chamber 104. The compensation chamber 104 is fluidly communicated with the main tank 100 via an orifice r1. First and second pressure sensors 110a and 110b are disposed so as to be exposed to the pressure changes in the compensation chamber and the main tank respectively. The outputs of the sensors 110a, 110b are fed respectively to the band pass filters 112 and 113.

The operation and arrangement of this embodiment is similar to that of the embodiment shown in FIG. 6 and differs basically in that due to the provision of the pressure sensor 110b, the output of the amplitude detection circuit 115 is representative of $\gamma$ Po vo/V2 whereby the output of the divider 116 is indicative of V2 and not V1+V2 (as in the case of the FIG. 6 embodiment).

Figure 25:
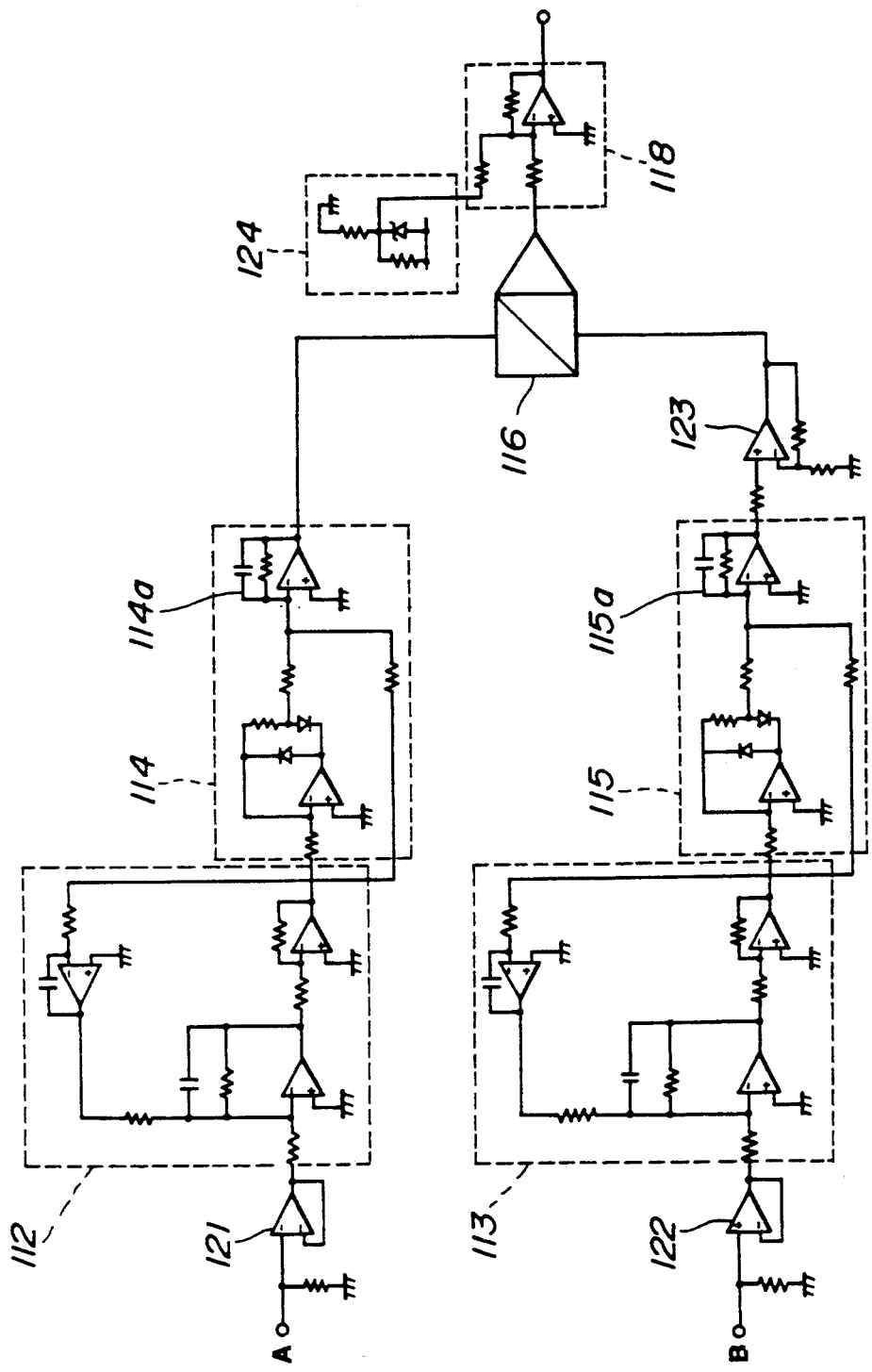
FIG. 25 is an example of the actual circuit arrangements which are used in connection with the fifth embodiment of the present invention.

FIG. 25 shows an example of the actual circuit arrangements which can be used in connection with the FIG. 24 embodiment. As will be noted, this circuit is essentially identical with that shown in FIG. 12 and as such no disclosure of the same is deemed necessary.

In the case the main tank exhibits a degree of flexibility, the outputs of the two pressure sensors can be applied individually to the band pass filters 112 and 113. In this situation the outputs of the amplitude detection circuits 114, 115 become $\gamma$ Po vo $|k1|$ and $\gamma$ $$\frac{voPo}{V2 + \Delta V} |k2|$$

respectively. Division in the divider gives.

$$V2 + \Delta V \frac{|k2|}{|k1|},$$

which is then corrected using $$\frac{|k1|}{|k2|}$$

developed via a calibration technique of the nature disclosed previously, to give V2+$\Delta V$. Subtraction of VT+$\Delta V$ then gives VL.

Figure 26:
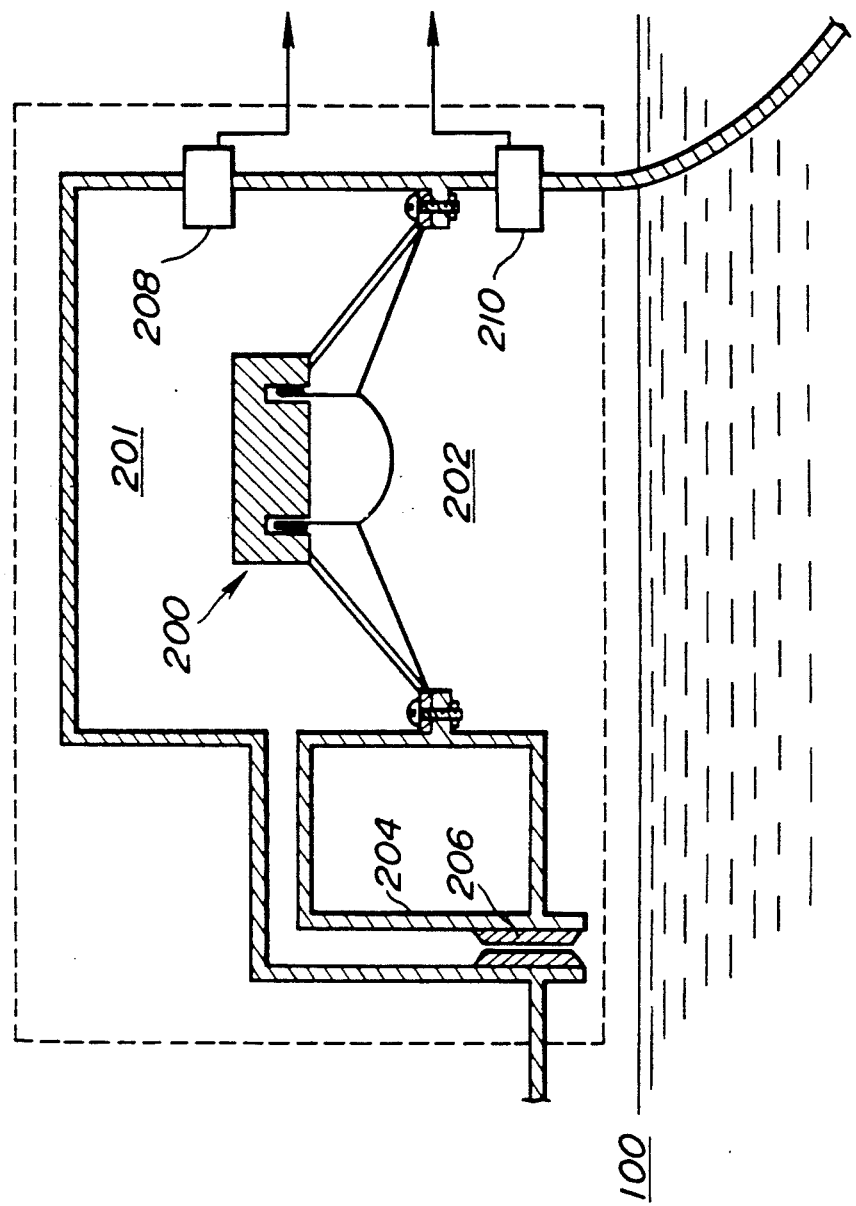
FIGS. 26 to 29 are cross-sectional views showing the arrangements which characterize sixth to ninth embodiments of the present invention.

FIGS. 26 to 29 show various embodiments wherein speakers and microphones are utilized. The arrangement shown in FIG. 26 is such that a speaker 200 is disposed in a chamber defining structure in a manner in a manner to divide the same into first and second sub-chamber sections 201, 202. The upper sub-chamber 201 as seen in the drawings is fluidly communicated with the interior of the main tank by way of a conduit 204. An orifice 206 is disposed the conduit 204 in a manner to limit the communication with the main tank 100 to the degree that changes in ambient pressure and temperature alone can be transmitted to the upper sub-chamber.

In this embodiment a dynamic microphone 208 is arranged to exposed to the interior of the upper sub-chamber 201 while a condensor type microphone 210 is arranged to be exposed to the lower sub-chamber 202. As will be noted from the drawings, the lower sub-chamber 202 is open directly to the interior of the main tank 100. Accordingly, the condensor microphone 210 is thus located in a position to detect the pressure changes in the main tank.

The reason that a dynamic microphone 208 is employed in the upper chamber 201 is that condensor type microphones tend to be sensitive to the point of becoming inoperative if exposed to the pressure changes of the nature which occur in the upper sub-chamber 201 for prolonged periods. The outputs of the microphones 208, 210 are fed to circuit arrangements of the nature illustrated in FIG. 24.

Figure 27:
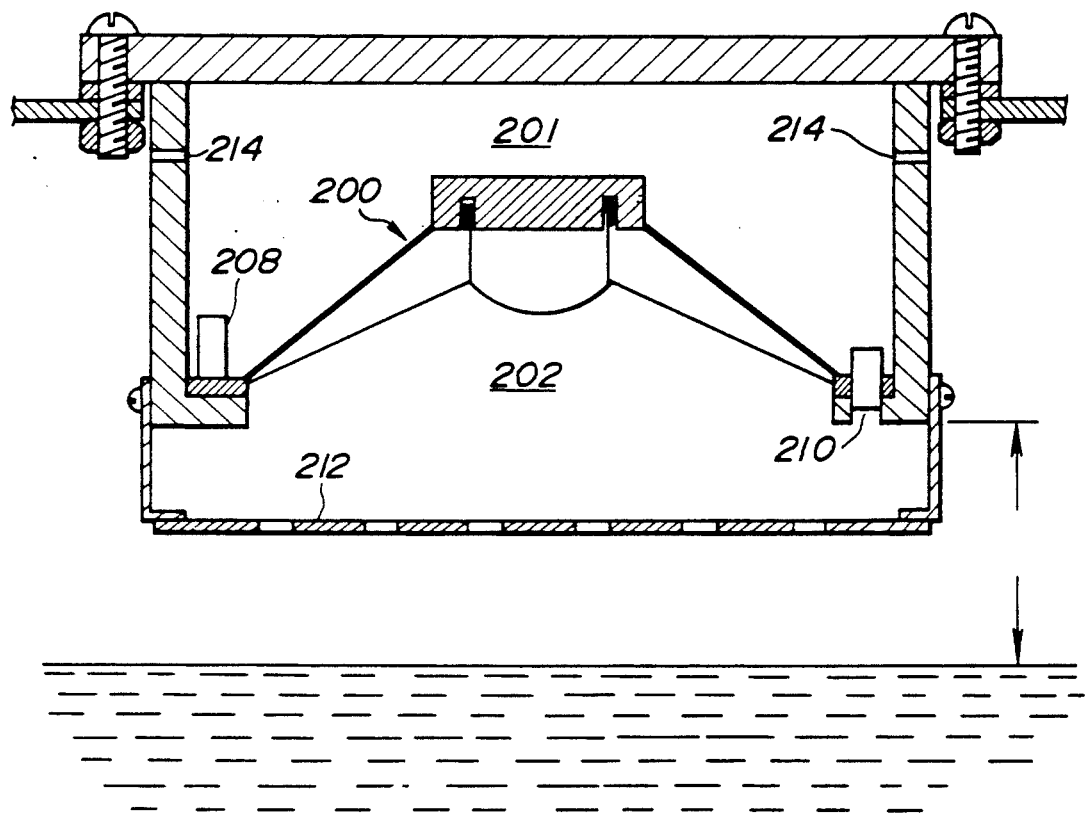

The embodiment shown in FIG. 27 is such as to include a perforate splash guard which is arranged to enclose the open end of the lower sub-chamber. In place of the conduit and orifice arrangement used in FIG. 26, small diameter bores 214 are formed through the walls of the structure in a manner which permits a very limited amount of fluid communication between the interior of the upper sub-chamber and the interior of the main tank 100.

Figure 28:
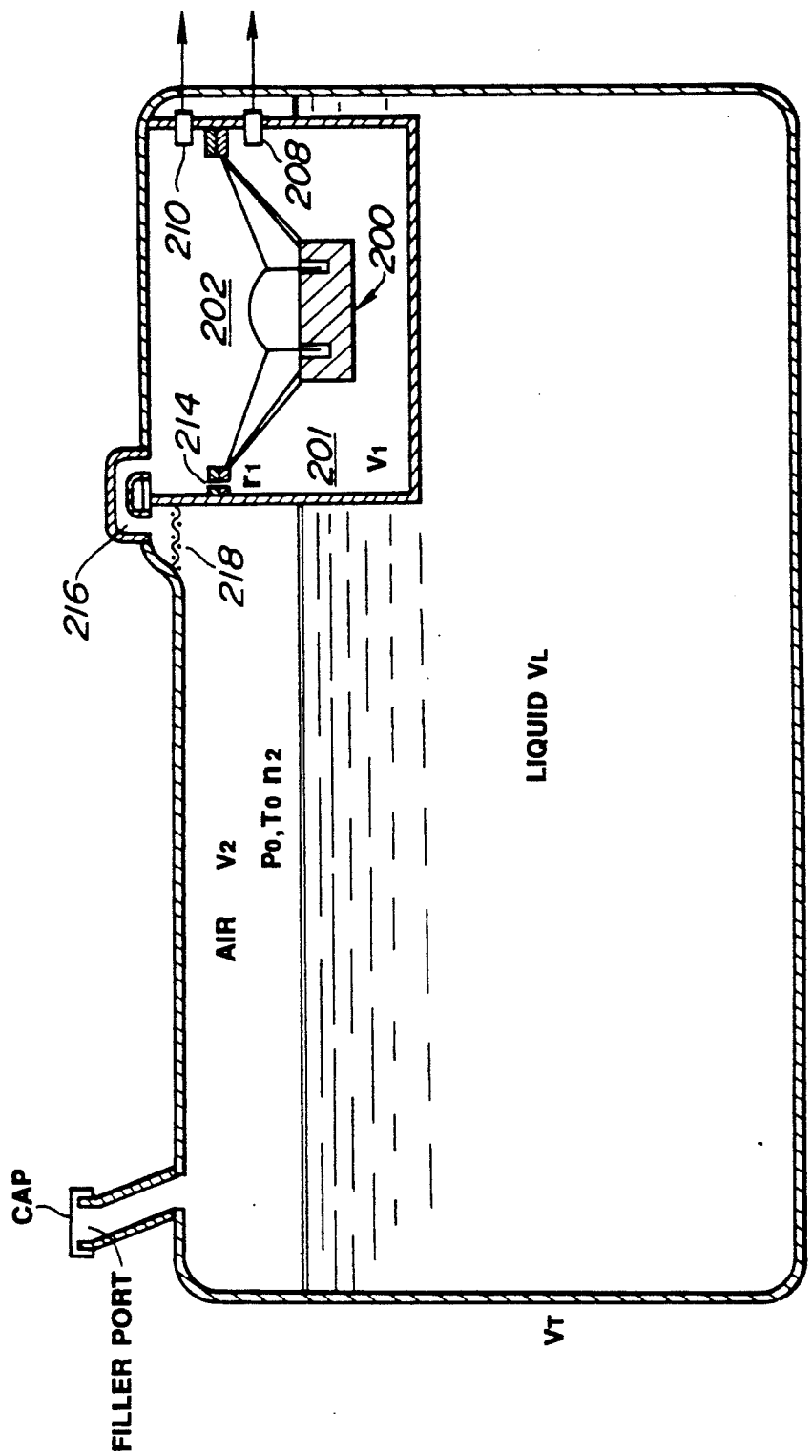

The embodiment shown in FIG. 28 is such that the speaker 200 is arranged to face vertically upward and the sub-chamber 201 which is defined thereabove is arranged to communicated with the interior of the main tank by way of a U-shaped passage 216 and a mesh screen 218. The provision of the mesh screen and the U-shaped passage 216 is deemed to reduce the chances of fuel splashing up into the sub-chamber 208 in which the speakers and microphones are disposed.

Figure 29:
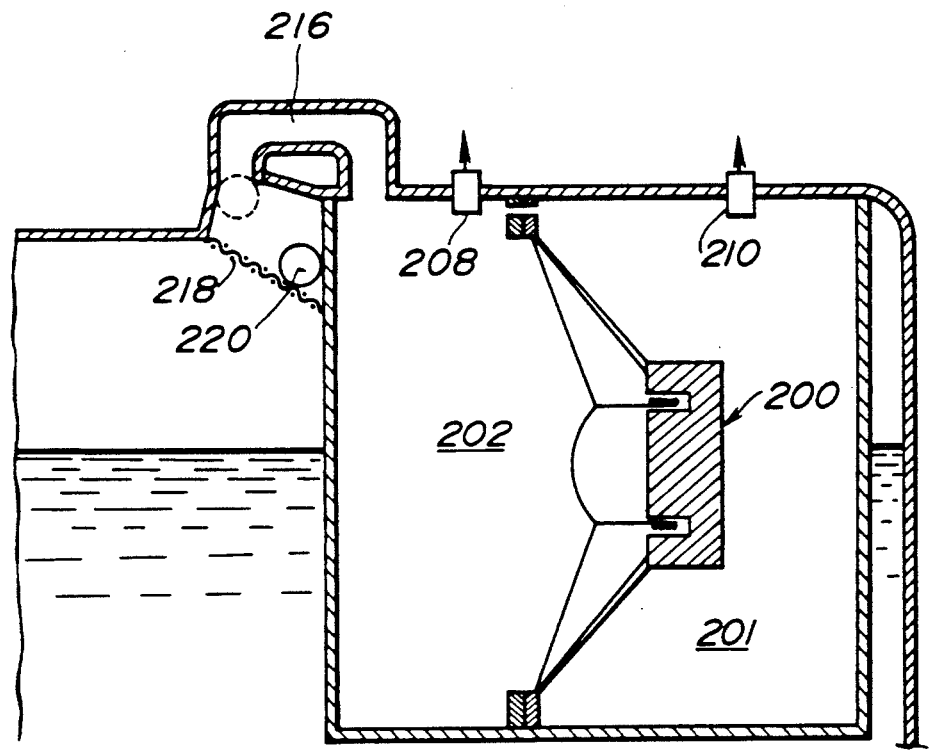

In the embodiment shown in FIG. 29 a float 220 is arranged block the U-shaped passage 216 in the case of large waves. Under normal circumstances this float 220 rests on top of the mesh grid 218.

Figure 30:
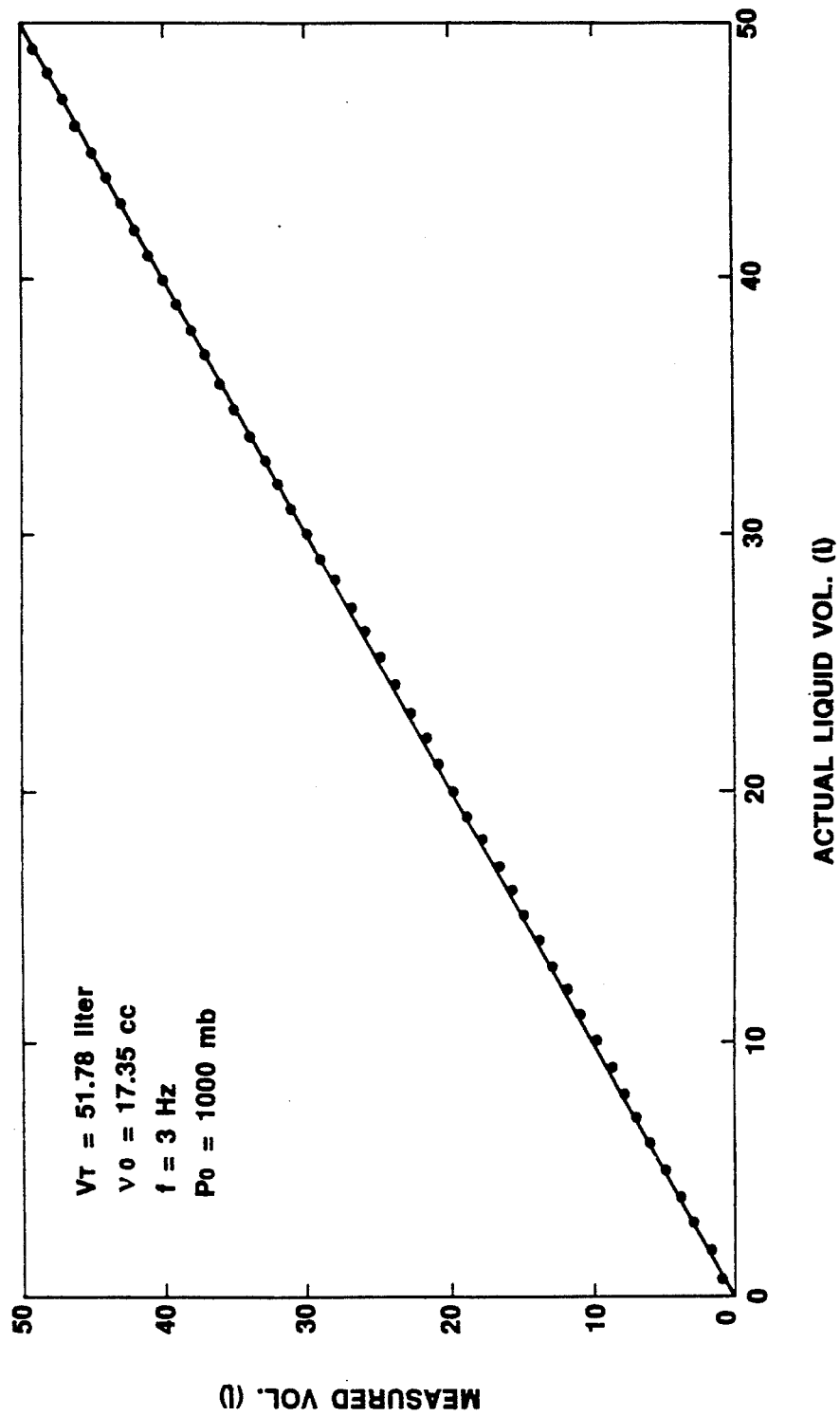
FIG. 30 is a graph which demonstrates the accuracy which is obtainable with the present invention.

FIG. 30 is a graphs which shows in terms of actual liquid content and the measured volume the remarkably linearity which is possible with the present invention.

Figure 31:
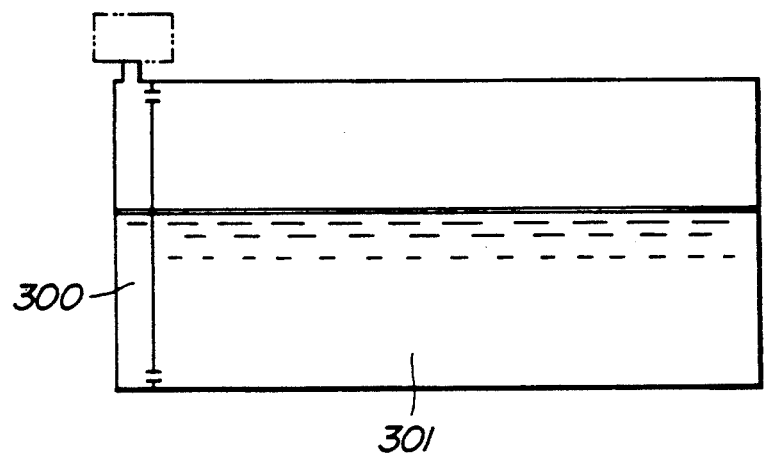
FIGS. 31 and 32 are views which show one method in which the present invention can be applied to large storage vessels.
Figure 32:
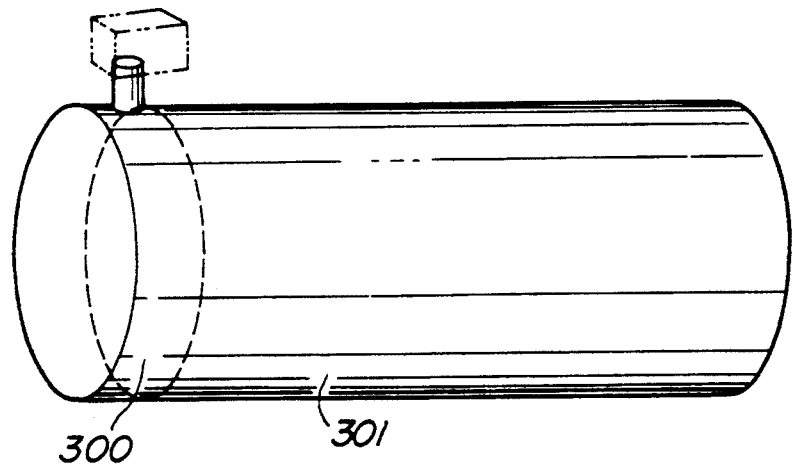

FIGS. 31 and 32 show a technique whereby the present invention can be readily applied to very large storage vessels. As shown by partitioning off a section 300 of the tank and permitting only limited communication between the section of the tank 300 which is baffled off and the reminder of the tank 301, as long as the capacity of the section 300 is accurately known, the need to provide a large displacement means is obviated.

Figure 33:
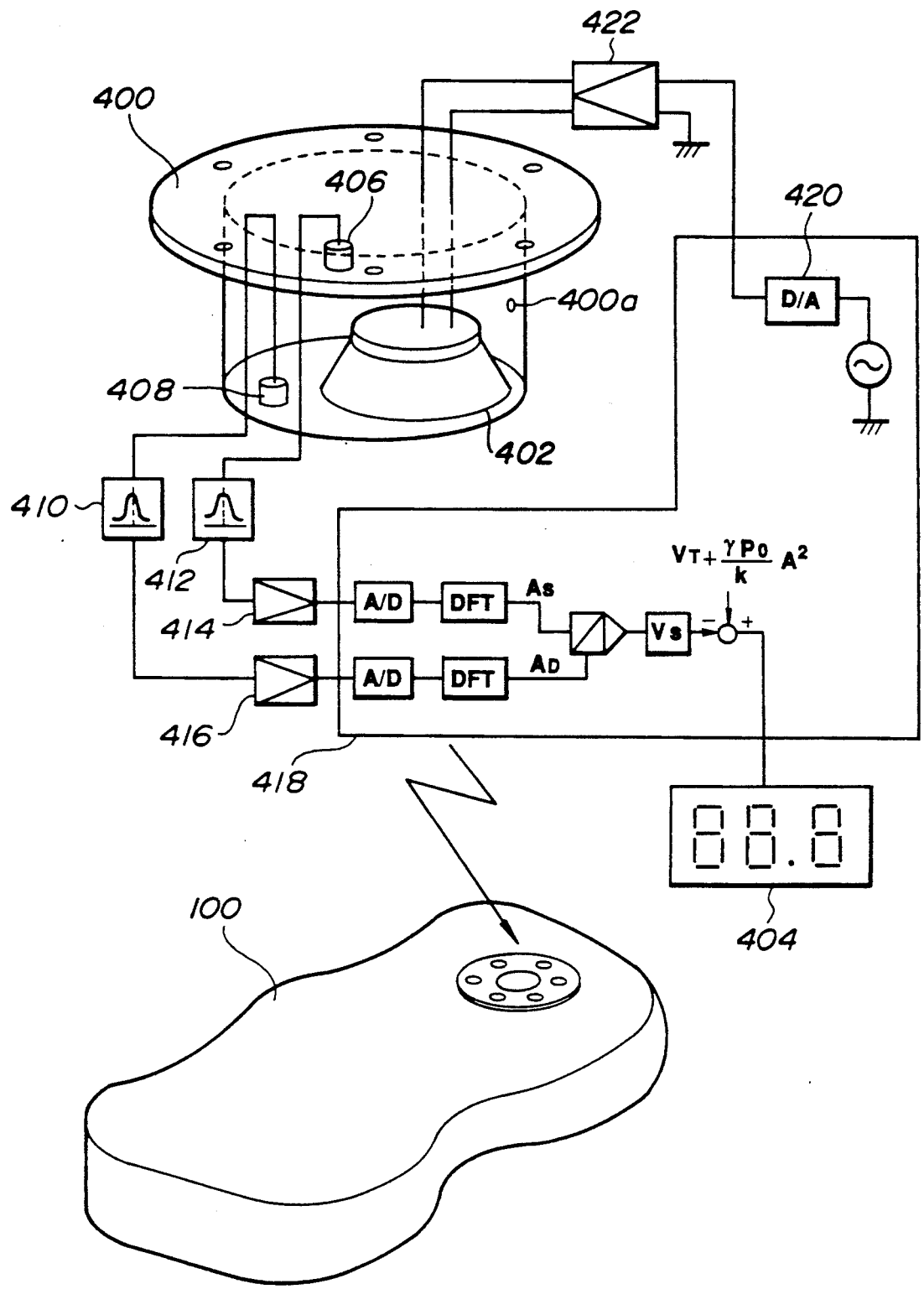
FIG. 33 is a schematic drawing showing an arrangement which characterizes a tenth embodiment of the present invention.

FIG. 33 shows a tenth embodiment of the present invention. In this arrangement a speaker housing 400 encloses a speaker 402 which is secured to the lower inboard face of the housing and oriented so as to face downward. Although not shown, suitable splash guards such as denoted by numeral 214 in FIG. 27, or the like, can provided on the lower end of the housing, if required. The housing is adapted to be disposed in a suitable opening 400a formed in a fuel tank or the like 100 and arranged to be detachably secured in position by suitable screws or the like type of fastening means.

It will be noted that the illustrated circuitry is all disposed in the housing with the exception of the display 404. The display of course can be included in an instrument cluster or the like such as on the dash board of an automotive vehicle or alternatively disposed in a suitable location. Disposition on the exterior of the housing 400 is not excluded.

First and second microphones 406, and 408 are disposed within the housing 400. In this instance both microphones take the form of piezoelectric ceramic type microphones, and that microphone 406 is exposed to the pressure fluctuations within the housing while microphone 408 is arranged to be exposed to the pressure fluctuations which occur within the vessel 100.

The outputs of the two microphones 406, 408 are supplied via band pass filters 410, 412 and amplifiers 414, 416 to a microcomputer 418. As shown, the analog signals from the two microphones 406, 408 are processed within the microprocessor in the manner schematically illustrated. Viz., the two signals are subject to A/D conversion and subsequently to direct Fourier transformation. The results As and AD of the DFT, are divided and processed in a manner which is essentially identical with the embodiment shown in FIG. 24 (for example). Accordingly, redundant of the same will be omitted for brevity.

It will be noted that the microcomputer is programmed in a manner which enables a suitable control signal to be generated and output via a non-illustrated I/0 to the speaker via an D/A converter 420 and suitable amplifier 422.

It should be noted that all of the preceding embodiments can be executed using a microprocessor in the manner generally as illustrated and described in connection with the instant embodiment.

Figure 34:
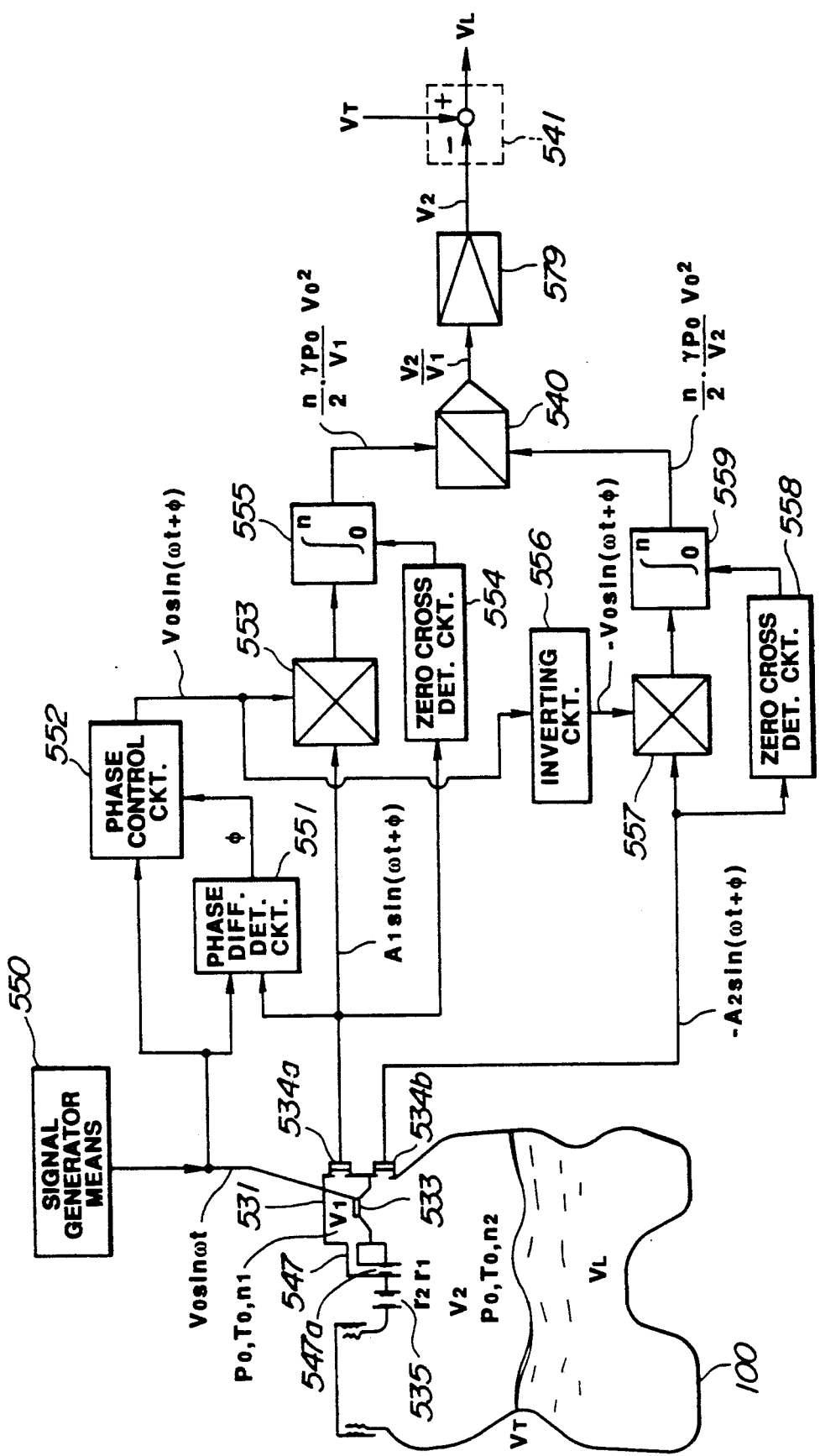
FIGS. 34-36 are schematic views showing arrangement which characterizes eleventh–thirteenth embodiments of the present invention.

FIG. 34 shows an eleventh embodiment of the present invention. This embodiment features are self-correlating arrangement for eliminating the effect of noise on the accuracy of the volume measurement. In this figure, the numeral 550 denotes a signal generator which is arranged to output a signal $vosin\omega t$ to a speaker 533. As shown, the speaker 533 is schematically shown as being enclosed in a housing 531 in manner which partitions off part thereof. The partitioned-off portion of the housing is fluidly communicated with the interior of the tank 100 by way of a conduit 547. An orifice 547a is disposed in the conduit 547. An air bleed 535 fluidly communicates the interior of the tank or vessel 100 with the ambient atmosphere.

A first microphone 534a is disposed so as to detect the pressure changes which take place in the enclosed partitioned off portion of the housing 531 while a second microphone 534b is disposed so as to be exposed to the pressure fluctuations which occur in the tank 100. This arrangement is essentially identical to that shown in FIG. 24.

It will be noted that there are finite -distances between the speaker cone and the microphones 534a and 534b. Thus, as the pressure wave must travel over these finite distances, a slight delay between the signal input to the speaker and the signals output by the microphones is inevitably produced. Although the distances are slightly different, the delay f which is introduced into the signals output by the two microphones is essentially the same and, while a difference theoretically exists, this difference is so minute as to be negligible.

The circuit arrangement which characterizes this embodiment is such as to correct the difference in phases of the signal which is applied to the speaker and the signals which are output by the microphones and thus screen out external noise.

As will be noted, in the event that the invention is applied to a vessel which is disposed in a very quiet noise free environment, such as a laboratory, little or no noise enters the tank 100. On the other hand, in the event that the system is used to determined the amount of fuel which is contained in an automotive fuel tank, noise which results from a plurality of different sources, such as the vibration of the exhaust system, vehicle suspension, differential gearing and the like, has a marked effect. Even though, it is possible in some circumstances to select a given frequency range in which a relatively high S/N ratio can be achieved, as the situation/environment changes the possibility that a substantial amount of noise will be encountered and erroneous volume readings be produced, increases.

In more detail, the circuit arrangement which is schematically depicted in this figure, includes a phase different detection circuit 551, a phase control circuit 552, a first and second multipliers 553 & 557, first and second integrators 555 & 559, first and second zero cross detection circuits 554 & 558, an inverter 556, a divider 540, a V1 gain amplifier 579 and a subtracter 541, all coupled as shown.

The operation of this arrangement is such that the output $Alsin(\omega t+f)$ of the microphone 534a is supplied to the phase difference detection circuit 551 along with the signal $vosin\omega t$ which is applied from the signal generator 550 to the speaker. This phase detection circuit 551 extracts the difference f and applies a signal indicative of the same to the phase control circuit 552. This circuit is also supplied with the $vosin\omega t$ signal from the signal generator 550 and is arranged to generate an output of $vosin(\omega t+\phi)$ to the multiplier 553 and the inverting circuit 556.

The multiplier 553 processes the $vosin(\omega t+f)$ and $Alsin(\omega t+f)$ signals and supplies the result $vosin(\omega t+f)\cdot Alsin(\omega t+f)$ $(Vo.Ai/2)$ to the first integrator 555. The operation of this latter mentioned circuit is controlled by the first zero cross detection circuit 554 which outputs an integration initiation signal indicative of the sine wave signal which is output by the microphone 534a crossing a zero level and a integration stop signal a predetermined time (t) later. Time (t) is selected to permit the integration of n values.

At the same time, the output of the phase control circuit 552 is supplied to the inverting circuit 556 and a −vosine(ωt+f) signal is supplied therefrom to the second multiplier 557. The output −A2sin(ωt+f) of the second microphone 534b is simultaneously supplied to the second multiplier and to the second zero cross detection circuit 558. The second zero cross circuit 558 detects the sin wave output of the second microphone crossing a zero level and issues a first integration initiation signal which starts the second integrator integrating, and a second signal which stops the integration a predetermined time later. In this case also the predetermined time is selected to allow n integrations. The output of the second multiplier circuit 557, that is to say the result of:

$$\int_0^t A2\sin(\omega t + f) \cdot v o\sin(\omega t + f) dt,$$

$$\left(\text{i.e. } \frac{n}{2} \cdot \frac{\gamma P o}{V2} \cdot v o^2\right)$$

is supplied to the divider 540 along with the output of the first integrator. Viz.:

$$\frac{n}{2} \cdot \frac{\gamma P o}{V1} \cdot v o^2$$

which is the result of:

$$\int_0^t A1\sin(\omega t + f) \cdot v o\sin(\omega t + f) dt$$

The divider divides the two inputs and outputs a signal indicative of V2/V1 to the V1 gain amplifier 579. This circuit removes the V1 value and outputs a signal indicative of V2. At the subtracter the value of V2 is subtracted from a signal indicative of VT. The output of the subtracter 541 is therefore indicative of VL—the amount of liquid in the tank 100.

It will be of course noted that this and subsequently described embodiments can also be executed using a microprocessor and that all of the steps involved in processing the data inputted from the microphone can be executed using an appropriately formulated computer program. The signal generating means can be controlled by an output from the microcomputer in a manner similar to that disclosed in the tenth embodiment.

Figure 35:
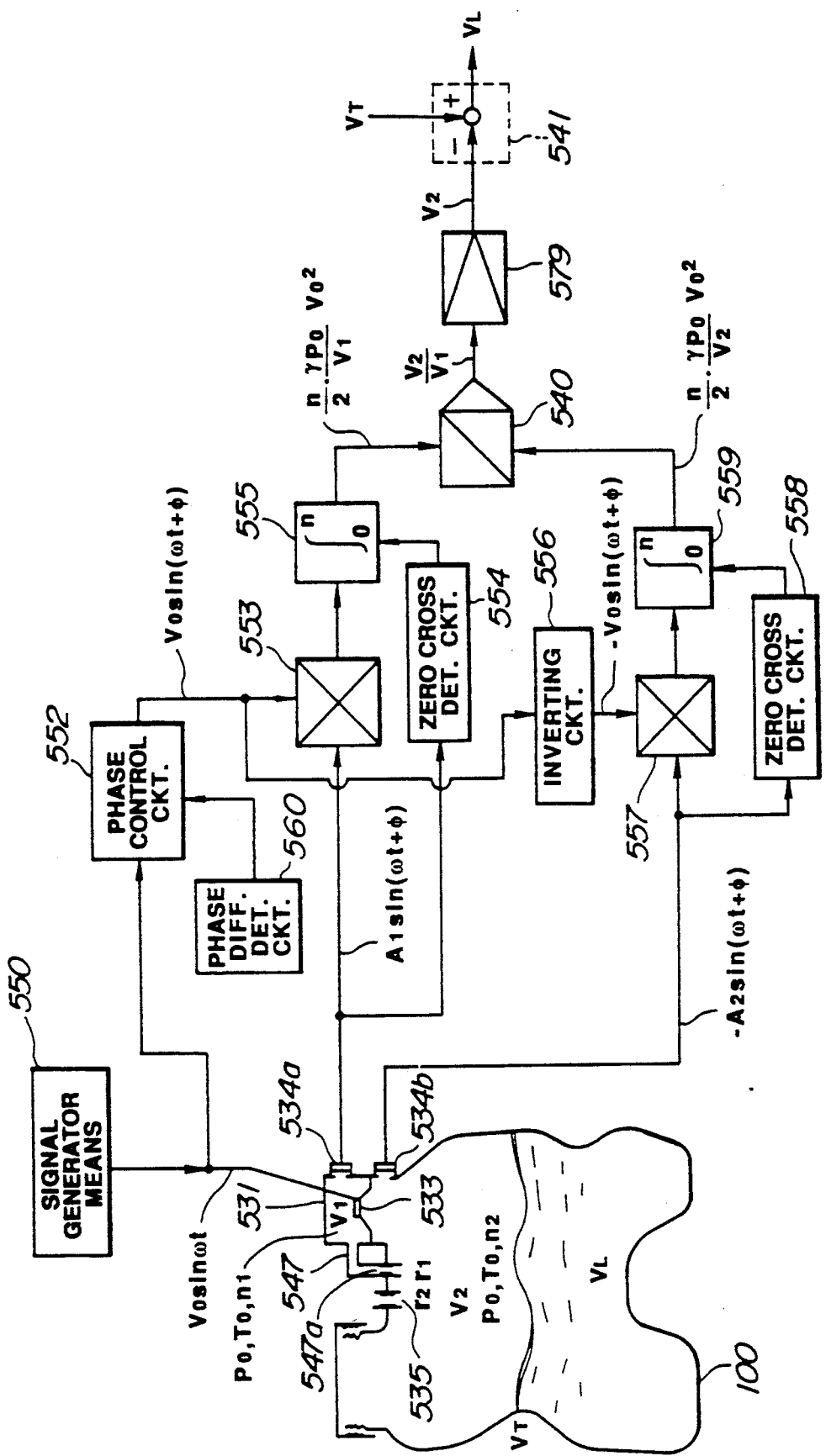

FIG. 35 shows an twelfth embodiment of the present invention. This arrangement differs from the previous one in that instead of the determining the phase difference by comparing the signal outputs of the signal generator 550 and the microphone 534a, a preset value is predetermined by taking the configuration, constructional characteristics, size, material etc., into consideration, and using a preset delay value in lieu of that which is actually determined in situ. This in this embodiment a phase difference determining circuit 560 is used in place of the signal responsive element 551 shown in FIG. 34.

Other than the above difference the instant embodiment functions in exactly the same manner as that shown in FIG. 34.

Figure 36:
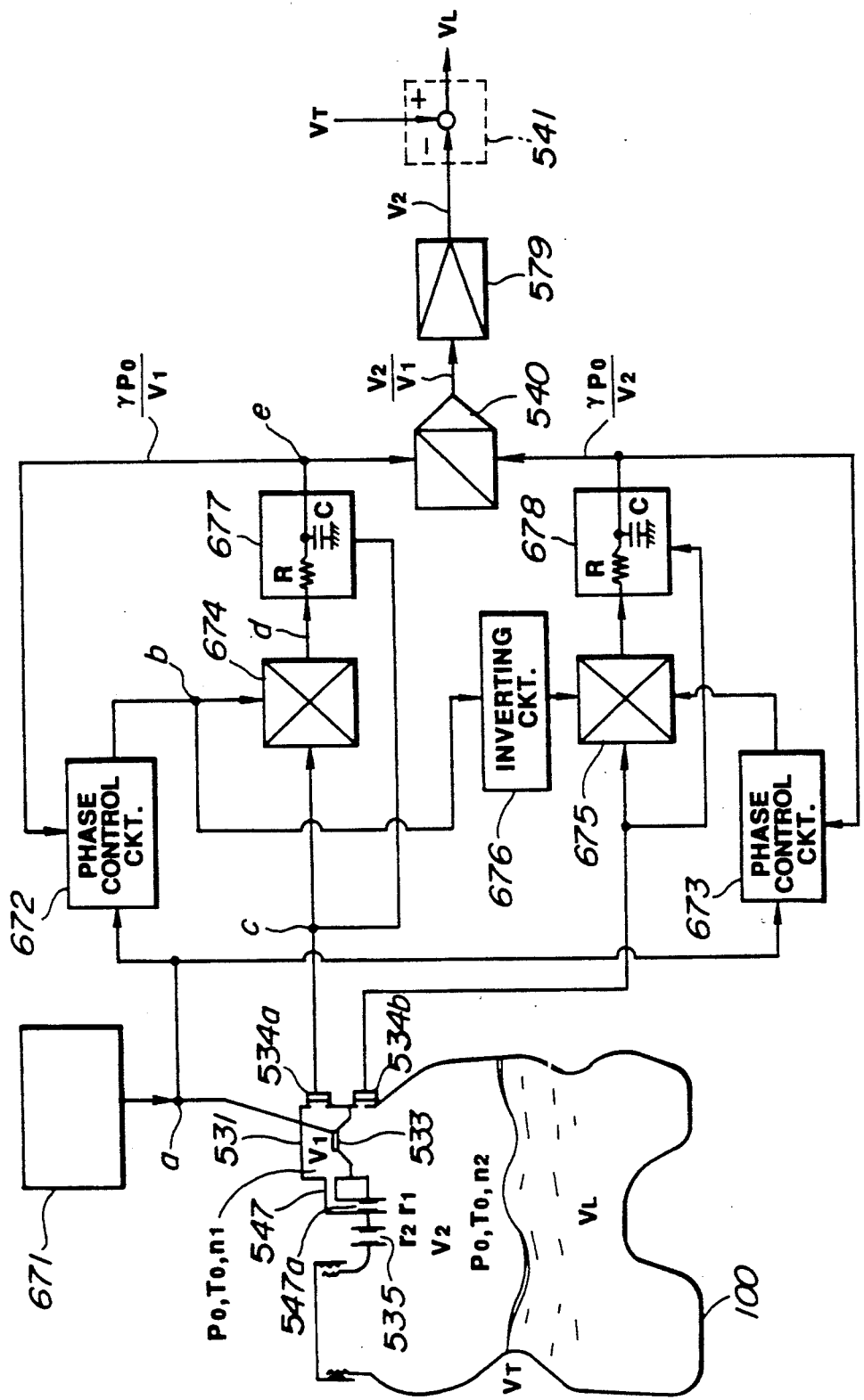

A thirteenth embodiment of the present invention is shown in FIG. 36. In this arrangement a signal generator which produces a M type signal train signal generator 671 is used. In this case a three stage shift register and an exclusive OR circuit are driven by a signal having a frequency of 10 Hz (for example) and used to supply the speaker 533 with an ON/OFF driver signal of the nature illustrated in FIG. 37(a).

First and second phase control circuits 672 and 673 are supplied with the signal output by the signal generator 671. These two phase control circuits are circuited with first and second integrator circuits 677 and 678 by way of first and second multipliers 674 and 675, respectively. The integrators 677 and 678 are supplied with the outputs of the microphones 534a and 534b.

Multipliers 674 and 675 are arranged to directly receive the outputs of the microphones 534a and 534b along with the outputs of the first and second phase control circuits 672, 673. The output of the phase control circuit 672 is also supplied to the multiplier 675 by way of an inverting circuit 676 which is operatively interposed therebetween.

The outputs of the integrator circuits 677, 678 are fed back to the phase control circuits 672 and 673 while being simultaneously supplied to a divider 540.

Figures 37A, 37B, 37C, 37D, 37E:
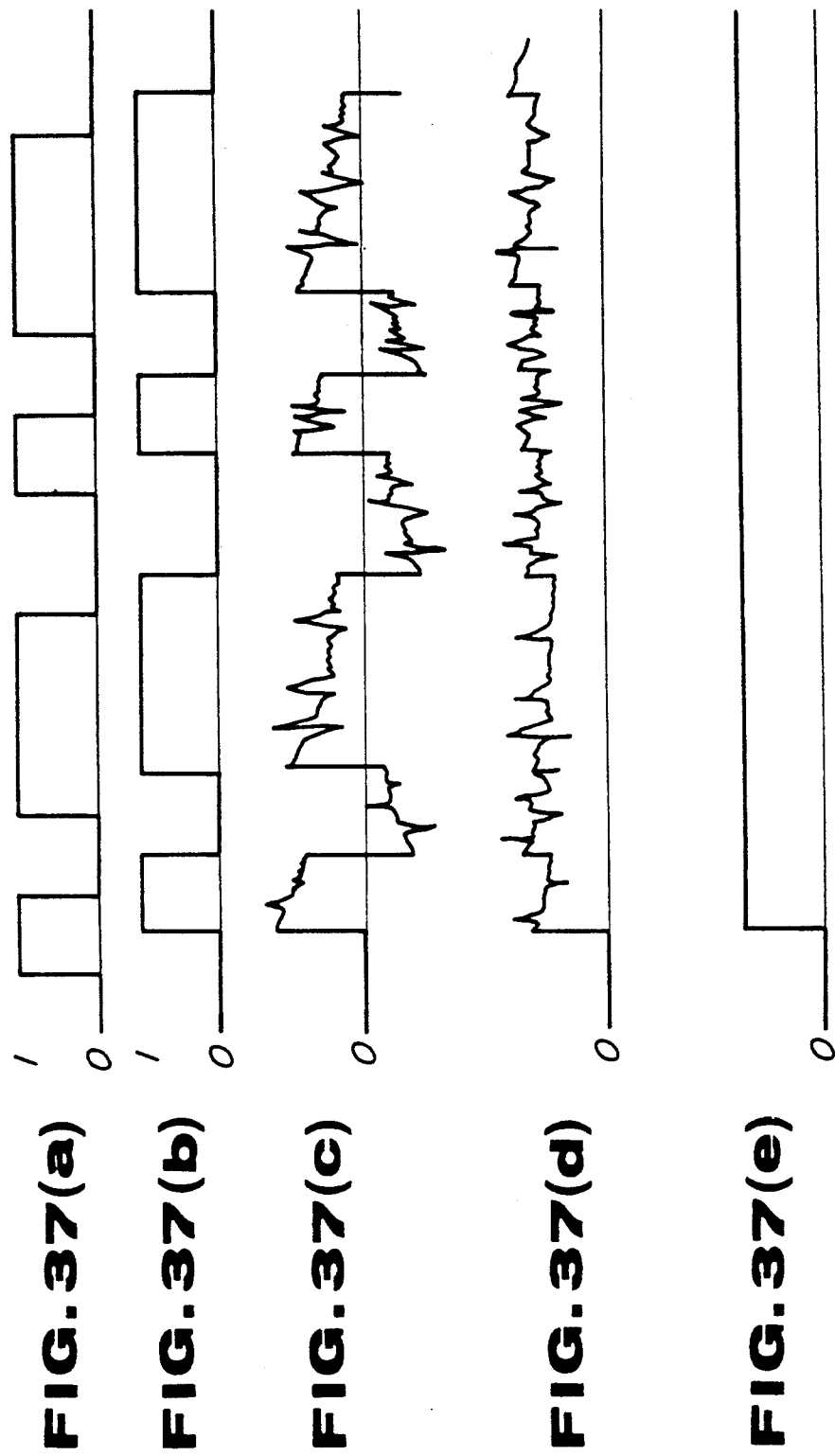
FIGS. 37($a$)–37($e$) define a time chart which depicts operations which characterize the operation of the thirteenth embodiment.

The operation of this embodiment is such that the signal generator 671 is arranged to output a signal having a frequency which is set a relatively low level, and thus induce the situation wherein output of the microphone 534a exhibits a wave form of the nature shown in FIG. 37(c). As will be appreciated the signal which is picked up by the microphone, is phase shifted by predetermined amount with respect to the signal output by the signal generator 671 (FIG. 37(a)).

The M type pluse train signal from the signal generator 671 is supplied to the first phase control circuit 672 wherein the output of the integrator circuit 677, which has been corrected for the shift in phase, is used to correct the phase of the same and thus result in a signal of the nature depicted in FIG. 37(b) being supplied to multiplier 674. This modifies the input from the microphone (FIG. 37(c)) in a manner which results in a signal having the wave form shown in FIG. 37(d) being applied to integrator 677. This results in a signal (FIG. 37(e) which is completely free of noise and which is indicative of γPo/V1, being output from the integrator.

As an essentially parallel operation is carried out with the circuitry associated with the second microphone 634b, an essentially redundant repetition of the operation thereof will be omitted for brevity, it being assumed that one skilled in the instant art will be readily able to comprehend the same.

The outputs of the two integrators 677 and 678 are supplied to the divider 540 where subtraction of γPo/V1 from γPo/V2 provides a V2/V1 value. By setting the gain of the amplifier 579 to represent V1 it is possible to a value of V2 (the amount of air in the tank 100).

Figure 38:
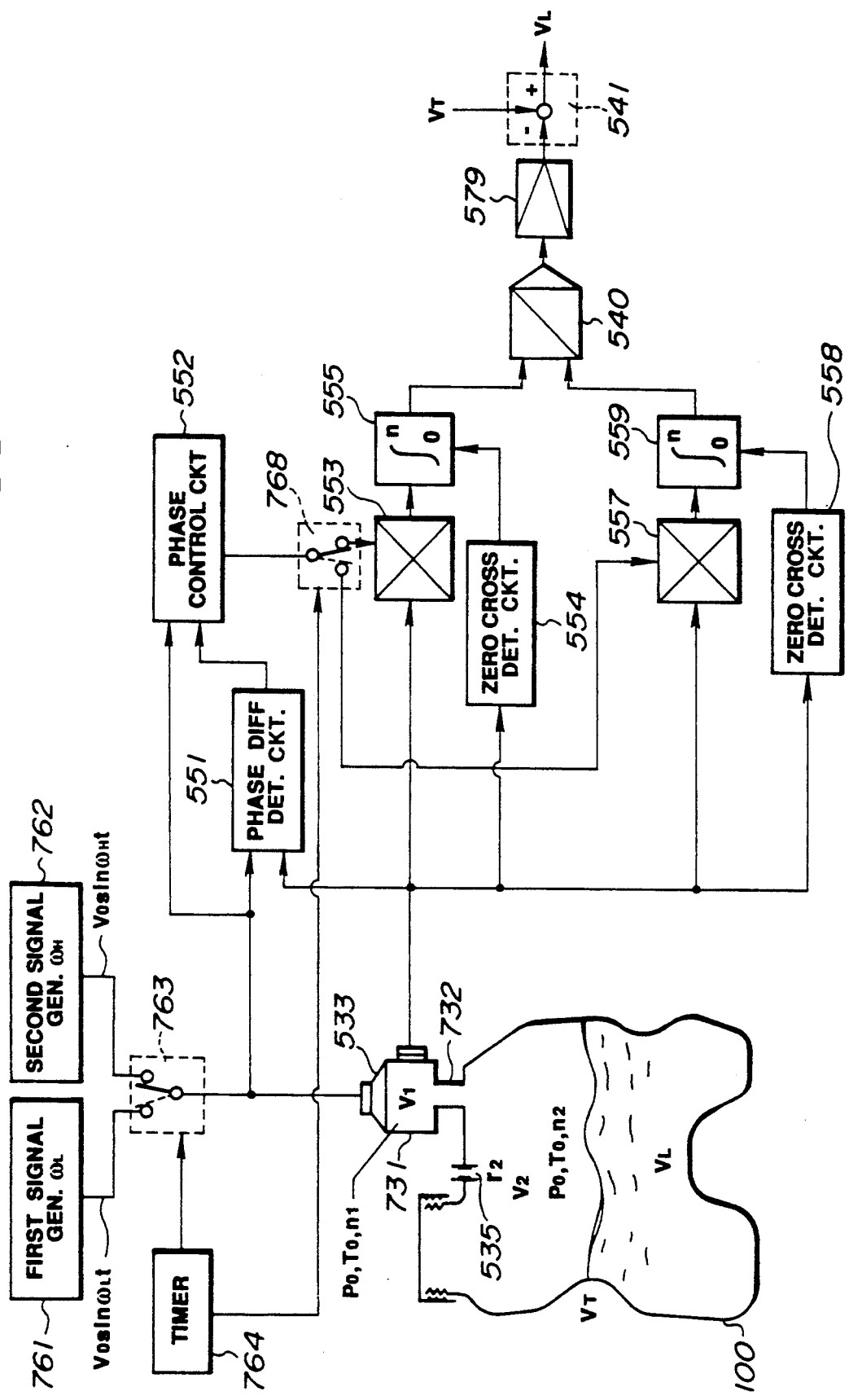
FIG. 38 is a schematic view showing the arrangement which characterizes a fourteenth embodiment of the present invention.

FIG. 38 shows a further embodiment of the present invention. This arrangement differs from the one shown in FIG. 34 in that this arrangement is of the type which utilizes two frequencies and one microphone as different from a one frequency two microphone type.

In this figure the same elements are denoted by the same numerals as used in FIG. 34.

As will be readily appreciated, instead of the single signal generator 550 two generators 761 and 762 are used to produce low and high sinusoidal type signals (Vo sin ωLt, and Vo sin ωHt). A switch 763 is operatively interposed between the two generators and the speaker 533. A timer 764 is operatively connected with the switch 763 and with a second switch 768. The second switch 768 is operatively connected to receive the output of a phase control circuit 552 and selectively switch connection between the first and second multiplier circuits 533, 557. Other than this, the arrangement of the zero cross circuits and the integrators is basically the same as that disclosed in connection with the eleventh embodiment (FIG. 34).

The operation of this arrangement is such that the timer 764 is arranged to switch the first and second switches at predetermined time intervals so that for a given period the output of the signal generator 762 is supplied to the speaker and and during this period the output of the microphone is processed via the multiplier 553 and the integrator 55 and the result latched in the latter. On the other hand, when the switches reverse position, the output of the microphone is processed via multiplier 557 and integrator 559. The integration outcome is latched in the integrator 559.

The divider receives the latched data and processes the same in a manner identical to that disclosed in connection with the embodiment shown in FIG. 34.

What is claimed is:

1. A measuring arrangement comprising:
   a vessel of known volume;
   an air bleed, said air bleed providing restricted fluid communicating between the interior of said vessel and the atmosphere;
   means defining a chamber;
   a displacement device disposed in said chamber, said displacement device being arranged to vary the pressure in said chamber, said displacement device dividing said chamber into first and second portions, the first portion being enclosed within said chamber and said second portion being fluidly communicated with the interior of said vessel;
   means providing a limited amount of fluid communication between the first portion of said chamber and the interior of said vessel;
   a first pressure sensor, said pressure sensor being responsive to the pressure in the first portion of said chamber and arranged to produce a first output indicative thereof;
   a second pressure sensor, said second pressure sensor being responsive to the pressure in said vessel and arranged to produce a second output indicative thereof;
   circuit means for receiving the outputs of said first and second pressure sensors and for filtering out first and second data, respectively, said circuit means including means for processing the first and second data in a manner which produces a signal indicative of the contents of said vessel.

2. A device as claimed in claim 1 wherein said displacement device comprises a diaphragm, said diaphragm partitioning said chamber into the first and second portions.

3. A device as claimed in claim 2 wherein said means for providing a limited communication between the first portion of the chamber and the interior of the vessel comprises a passage which includes an orifice.

4. A device as claimed in claim 2 wherein said second portion has an open end which provides unrestricted communicated between the second portion and interior of said vessel.

5. A method of measuring the contents of a vessel, comprising the steps of:
   permitting restricted fluid communication between the interior of the vessel and the ambient atmosphere by way of an air bleed;
   energizing a displacement device which is disposed in a chamber fluidly communicated with the vessel, in a manner which varies the pressure in said chamber and in said vessel;
   sensing the pressure in said chamber using a first pressure sensor and producing a first output indicative thereof;
   sensing the pressure in said vessel using a second pressure sensor and producing a second output indicative thereof;
   filtering the first and second outputs to obtain first and second pieces of information; and
   processing the first and second pieces of information in a manner which produces a signal indicative of the contents of said vessel.

* * * * *